United States Patent
Yerramalli et al.

(10) Patent No.: US 12,317,315 B2
(45) Date of Patent: May 27, 2025

(54) PARTIAL RANDOM ACCESS CHANNEL PROCEDURE

(71) Applicant: QUALCOMM Incorporated, San Diego, CA (US)

(72) Inventors: Srinivas Yerramalli, San Diego, CA (US); Alexandros Manolakos, Escondido, CA (US); Sony Akkarakaran, Poway, CA (US); Lorenzo Ferrari, Castro Valley, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/488,837

(22) Filed: Oct. 17, 2023

(65) Prior Publication Data

US 2024/0049279 A1    Feb. 8, 2024

Related U.S. Application Data

(62) Division of application No. 17/319,416, filed on May 13, 2021, now Pat. No. 11,832,295.

(Continued)

(51) Int. Cl.
*H04W 74/00* (2009.01)
*H04L 5/00* (2006.01)
(Continued)

(52) U.S. Cl.
CPC ......... *H04W 74/006* (2013.01); *H04L 5/0051* (2013.01); *H04L 25/0226* (2013.01);
(Continued)

(58) Field of Classification Search
CPC ............. H04W 74/006; H04W 74/008; H04W 74/0833; H04W 76/11; H04W 72/232;
(Continued)

(56) References Cited

U.S. PATENT DOCUMENTS

| | | |
|---|---|---|
| 2014/0112254 A1 | 4/2014 | Lindoff et al. |
| 2019/0254071 A1 | 8/2019 | Park |

(Continued)

FOREIGN PATENT DOCUMENTS

| | | |
|---|---|---|
| JP | 2015534743 A | 12/2015 |
| WO | 2017014910 A1 | 1/2017 |
| WO | WO-2020066103 A1 | 4/2020 |

OTHER PUBLICATIONS

Huawei, et al., "On UTDOA for Nb-Iot," 3GPP Draft, 3GPP TSG RAN WG1 Meeting #88, R1-1701773, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 13-Feb. 17, 2017, Feb. 12, 2017 (Feb. 12, 2017), XP051208939, 12 pages, Section 2.1; p. 1-p. 3.

(Continued)

*Primary Examiner* — Candal Elpenord
(74) *Attorney, Agent, or Firm* — Thien T. Nguyen

(57) ABSTRACT

In an embodiment, a serving BS of a UE may transmit a PDCCH communication to the UE. The PDCCH communication triggers a partial RACH procedure, whereby a RACH transmission is performed. In some designs, the RACH transmission is for positioning, and positioning measurements are performed at the serving BS and (optionally) at one or more non-serving BSs. In some designs, measurement data based on the positioning measurements are conveyed to a position estimation entity (e.g., LMF), which performs a positioning estimate of the UE.

10 Claims, 15 Drawing Sheets

Related U.S. Application Data

(60) Provisional application No. 63/027,694, filed on May 20, 2020.

(51) Int. Cl.
    *H04L 25/02* (2006.01)
    *H04W 74/08* (2024.01)
    *H04W 74/0833* (2024.01)
    *H04W 76/11* (2018.01)

(52) U.S. Cl.
    CPC ..... *H04W 74/002* (2013.01); *H04W 74/0833* (2013.01); *H04W 76/11* (2018.02)

(58) Field of Classification Search
    CPC .... H04W 16/14; H04L 5/0051; H04L 5/0226; G01S 5/0045; G01S 5/0205; G01S 5/0009
    USPC .................................................. 370/329–330
    See application file for complete search history.

(56) References Cited

U.S. PATENT DOCUMENTS

| | | |
|---|---|---|
| 2021/0368538 A1 | 11/2021 | Yerramalli et al. |
| 2021/0373148 A1 | 12/2021 | Chen et al. |
| 2022/0015061 A1 | 1/2022 | Kim et al. |
| 2022/0095388 A1 | 3/2022 | Sosnin et al. |
| 2022/0109527 A1* | 4/2022 | Hwang ................. H04L 1/1864 |
| 2022/0110085 A1 | 4/2022 | Khoryaev et al. |
| 2022/0182877 A1 | 6/2022 | Zhang |

OTHER PUBLICATIONS

International Preliminary Report on Patentability—PCT/US2021/032485—The International Bureau of WIPO—Geneva, Switzerland—Dec. 1, 2022.

International Search Report and Written Opinion—PCT/US2021/032485—ISA/EPO—Sep. 21, 2021.

Mitsubishi Electric: "Views on DL and UL Positioning Techniques," 3GPP Draft, 3GPP TSG RAN WG1 Meeting #96, R1-1902836-Positioning_DLUL_B, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25-Mar. 1, 2019, Feb. 15, 2019 (Feb. 15, 2019), XP051600531, 4 pages, Section 2.1. 2.2, p. 1-p. 2.

Ericsson: "On 2 Step RACH Demodulation", 3GPP TSG-RAN WG4 #94-e, R4-2001183, e-meeting, Feb. 24, 2020-Mar. 6, 2020, Feb. 14, 2020, pp. 1-4.

NTT Docomo Inc: "Discussion on Remaining Details on RACH Procedure", 3GPP TSG RAN WG1 Meeting NR#3, R1-1716074, Nagoya, Japan, Sep. 18, 2017-Sep. 21, 2017, Sep. 12, 2017, 7 pages.

\* cited by examiner

PARTIAL RANDOM ACCESS CHANNEL PROCEDURE

CROSS-REFERENCE TO RELATED APPLICATION

The present Application for Patent is a Divisional of U.S. Non-Provisional application Ser. No. 17/319,416, entitled "PARTIAL RANDOM ACCESS CHANNEL PROCEDURE", filed May 13, 2021, which in turn claims the benefit of U.S. Provisional Application No. 63/027,694, entitled "PARTIAL RANDOM ACCESS CHANNEL PROCEDURE", filed May 20, 2020, each of which is assigned to the assignee hereof and hereby expressly incorporated by reference herein in its entirety.

BACKGROUND OF THE DISCLOSURE

1. Field of the Disclosure

Aspects of the disclosure relate generally to a partial random access channel (RACH) procedure.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes receiving a physical downlink control channel (PDCCH) communication; and triggering, in response to the PDCCH communication, a partial random access channel (RACH) procedure.

In some aspects, the partial RACH procedure comprises transmission of a RACH signal for positioning.

In some aspects, the RACH signal for positioning is targeted to a serving base station (BS) of the UE and at least one non-serving BS of the UE.

In some aspects, the triggering is responsive to a configuration of the PDCCH communication.

In some aspects, the triggering is responsive to at least one field of the PDCCH communication.

In some aspects, the at least one field comprises a radio network temporary identifier (RNTI), or the at least one field is part of a downlink control information (DCI) communication, or any combination thereof.

In some aspects, the at least one field in the DCI communication comprises a first value, the partial RACH procedure comprising a RACH transmission with a first configuration based on the first value, further comprising: receiving another DCI communication with the at least one field comprising a second value, the another DCI communication triggering another partial RACH procedure comprising another RACH transmission with a second configuration based on the second value.

In some aspects, the triggering is responsive to a size of the PDCCH communication.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the UE does not have an active sounding reference signal (SRS) configuration for triggering transmission of an SRS for positioning during the receiving and the triggering.

In some aspects, the partial RACH procedure comprises a RACH transmission that is transmitted on one or more beams corresponding to a plurality of synchronization signal blocks (SSBs), wherein the partial RACH procedure comprises a RACH transmission that is transmitted over one or more frequency layers on one or more respective RACH occasions, a number of the one or more frequency layers being based on a number of configured frequency layers for the UE, wherein the partial RACH procedure comprises transmission of repetitions of a RACH preamble across multiple RACH occasions, or any combination thereof.

In some aspects, the RACH procedure is based on a timing offset indicated via the PDCCH communication.

In some aspects, the RACH procedure is performed over licensed spectrum that is licensed to a particular radio access technology (RAT), or the RACH procedure is performed over shared spectrum that is shared by a plurality of RATs.

In some aspects, the partial RACH procedure is an uplink part of a joint uplink and downlink positioning procedure, and the PDCCH is further configured to trigger a downlink part of the joint uplink and downlink positioning procedure.

In an aspect, a method of operating a serving base station (BS) of a user equipment (UE) includes transmitting, to the UE, a physical downlink control channel (PDCCH) communication configured to trigger a partial random access channel (RACH) procedure; and receiving, from the UE in response to the PDCCH communication, a RACH transmission.

In some aspects, the RACH transmission is for positioning, further comprising: performing one or more positioning measurements on the RACH transmission.

In some aspects, the RACH signal for positioning is targeted to the serving BS of the UE and at least one non-serving BS of the UE.

In some aspects, the method includes notifying the at least one non-serving BS or a location management function (LMF) of the partial RACH procedure to facilitate the at least one non-serving BS to perform positioning measurements on the RACH transmission.

In some aspects, the method includes sending measurement data based on the one or more positioning measurements to a position estimation entity.

In some aspects, the PDCCH communication is configured to trigger the partial RACH procedure based on a configuration of the PDCCH communication.

In some aspects, the PDCCH communication is configured to trigger the partial RACH procedure based on at least one field of the PDCCH communication.

In some aspects, the at least one field comprises a radio network temporary identifier (RNTI), or the at least one field is part of a downlink control information (DCI) communication, or any combination thereof.

In some aspects, the at least one field in the DCI communication comprises a first value, the RACH transmission arranged with a first configuration based on the first value, further comprising: transmitting another DCI communication with the at least one field comprising a second value, the another DCI communication configured to trigger another partial RACH procedure comprising another RACH transmission with a second configuration based on the second value.

In some aspects, the PDCCH communication is configured to trigger the partial RACH procedure based on a size of the PDCCH communication.

In some aspects, the partial RACH procedure is a partial 4-Step RACH procedure, wherein the partial RACH procedure comprises reception of a RACH preamble only without a RACH response to the RACH preamble.

In some aspects, the partial RACH procedure is a partial 2-Step RACH procedure, and the partial RACH procedure comprises reception of a RACH preamble and a physical uplink shared channel (PUSCH) communication without a RACH response to the RACH preamble or the PUSCH communication.

In some aspects, the UE does not have an active sounding reference signal (SRS) configuration for triggering transmission of an SRS for positioning during the transmitting and the receiving.

In some aspects, the RACH transmission is received on one or more beams corresponding to a plurality of synchronization signal blocks (SSBs), wherein the RACH transmission is received over one or more frequency layers on one or more respective RACH occasions, a number of the one or more frequency layers being based on a number of configured frequency layers for the UE, wherein the RACH transmission comprises repetitions of a RACH preamble across multiple RACH occasions, or any combination thereof.

In some aspects, the RACH procedure may be based on a timing offset indicated via the PDCCH communication.

In some aspects, the RACH transmission is received over licensed spectrum that is licensed to a particular radio access technology (RAT), or the RACH transmission is received over shared spectrum that is shared by a plurality of RATs.

In some aspects, the partial RACH procedure is an uplink part of a joint uplink and downlink positioning procedure, and the PDCCH is further configured to trigger a downlink part of the joint uplink and downlink positioning procedure.

In some aspects, the partial RACH procedure is an uplink part of a joint uplink and downlink positioning procedure.

In an aspect, a method of operating a non-serving base station (BS) of a user equipment (UE) includes receiving an indication of a random access channel (RACH) transmission from the UE that is associated with a partial RACH procedure; and receiving the RACH transmission based on the indication.

In some aspects, the RACH transmission is for positioning, further comprising: performing one or more positioning measurements on the RACH transmission.

In some aspects, the method includes sending measurement data based on the one or more positioning measurements to a position estimation entity.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the RACH transmission is received over licensed spectrum that is licensed to a particular radio access technology (RAT), or the RACH transmission is received over shared spectrum that is shared by a plurality of RATs.

In an aspect, a method of operating a position estimation entity includes receiving measurement data based on one or more positioning measurements performed by a set of base stations (BSs) on a random access channel (RACH) transmission for positioning from a user equipment (UE); and determining a positioning estimate of the UE based at least in part upon the measurement data.

In some aspects, the RACH transmission is associated with a partial RACH procedure.

In some aspects, the partial RACH procedure is triggered by a physical downlink control channel (PDCCH) communication from a serving BS of the UE.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the RACH transmission for positioning is transmitted by the UE over licensed spectrum that is licensed to a particular radio access technology (RAT), or the RACH transmission is received over shared spectrum that is shared by a plurality of RATs.

In an aspect, a user equipment (UE) includes a memory; a communication interface; and at least one processor communicatively coupled to the memory and the communication interface, the at least one processor configured to: receive, via the communication interface, a physical downlink control channel (PDCCH) communication; and trigger, in response to the PDCCH communication, a partial random access channel (RACH) procedure.

In some aspects, the partial RACH procedure comprises transmission of a RACH signal for positioning.

In some aspects, the RACH signal for positioning is targeted to a serving base station (BS) of the UE and at least one non-serving BS of the UE.

In some aspects, the triggering is responsive to a configuration of the PDCCH communication.

In some aspects, the triggering is responsive to at least one field of the PDCCH communication.

In some aspects, the at least one field comprises a radio network temporary identifier (RNTI), or the at least one field is part of a downlink control information (DCI) communication, or any combination thereof.

In some aspects, the at least one field in the DCI communication comprises a first value, the partial RACH procedure comprising a RACH transmission with a first configuration based on the first value, further comprising: receive, via the communication interface, another DCI communication with the at least one field comprising a second value, the another DCI communication triggering another partial RACH procedure comprising another RACH transmission with a second configuration based on the second value.

In some aspects, the triggering is responsive to a size of the PDCCH communication.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the UE does not have an active sounding reference signal (SRS) configuration for triggering transmission of an SRS for positioning during the receiving and the triggering.

In some aspects, the partial RACH procedure comprises a RACH transmission that is transmitted on one or more beams corresponding to a plurality of synchronization signal blocks (SSBs), wherein the partial RACH procedure comprises a RACH transmission that is transmitted over one or more frequency layers on one or more respective RACH occasions, a number of the one or more frequency layers being based on a number of configured frequency layers for the UE, wherein the partial RACH procedure comprises transmission of repetitions of a RACH preamble across multiple RACH occasions, or any combination thereof.

In some aspects, the RACH procedure is based on a timing offset indicated via the PDCCH communication.

In some aspects, the RACH procedure is performed over licensed spectrum that is licensed to a particular radio access technology (RAT), or the RACH procedure is performed over shared spectrum that is shared by a plurality of RATs.

In some aspects, the partial RACH procedure is an uplink part of a joint uplink and downlink positioning procedure, and the PDCCH is further configured to trigger a downlink part of the joint uplink and downlink positioning procedure.

In some aspects, the partial RACH procedure is an uplink part of a joint uplink and downlink positioning procedure.

In an aspect, a base station includes a memory; a communication interface; and at least one processor communicatively coupled to the memory and the communication interface, the at least one processor configured to: cause the communication interface to transmit, to the UE, a physical downlink control channel (PDCCH) communication configured to trigger a partial random access channel (RACH) procedure; and receive, via the communication interface, from the UE in response to the PDCCH communication, a RACH transmission.

In some aspects, the RACH transmission is for positioning, further comprising: perform one or more positioning measurements on the RACH transmission.

In some aspects, the RACH signal for positioning is targeted to the serving BS of the UE and at least one non-serving BS of the UE.

In some aspects, the at least one processor is further configured to: notify the at least one non-serving BS or a location management function (LMF) of the partial RACH procedure to facilitate the at least one non-serving BS to perform positioning measurements on the RACH transmission.

In some aspects, the at least one processor is further configured to: cause the communication interface to send measurement data based on the one or more positioning measurements to a position estimation entity.

In some aspects, the PDCCH communication is configured to trigger the partial RACH procedure based on a configuration of the PDCCH communication.

In some aspects, the PDCCH communication is configured to trigger the partial RACH procedure based on at least one field of the PDCCH communication.

In some aspects, the at least one field comprises a radio network temporary identifier (RNTI), or the at least one field is part of a downlink control information (DCI) communication, or any combination thereof.

In some aspects, the at least one field in the DCI communication comprises a first value, the RACH transmission arranged with a first configuration based on the first value, further comprising: cause the communication interface to transmit another DCI communication with the at least one field comprising a second value, the another DCI communication configured to trigger another partial RACH procedure comprising another RACH transmission with a second configuration based on the second value.

In some aspects, the PDCCH communication is configured to trigger the partial RACH procedure based on a size of the PDCCH communication.

In some aspects, the partial RACH procedure is a partial 4-Step RACH procedure, wherein the partial RACH procedure comprises reception of a RACH preamble only without a RACH response to the RACH preamble.

In some aspects, the partial RACH procedure is a partial 2-Step RACH procedure, and the partial RACH procedure comprises reception of a RACH preamble and a physical uplink shared channel (PUSCH) communication without a RACH response to the RACH preamble or the PUSCH communication.

In some aspects, the UE does not have an active sounding reference signal (SRS) configuration for triggering transmission of an SRS for positioning during the transmitting and the receiving.

In some aspects, the RACH transmission is received on one or more beams corresponding to a plurality of synchronization signal blocks (SSBs), wherein the RACH transmission is received over one or more frequency layers on one or more respective RACH occasions, a number of the one or more frequency layers being based on a number of configured frequency layers for the UE, wherein the RACH transmission comprises repetitions of a RACH preamble across multiple RACH occasions, or any combination thereof.

In some aspects, the RACH procedure may be based on a timing offset indicated via the PDCCH communication.

In some aspects, the RACH transmission is received over licensed spectrum that is licensed to a particular radio access technology (RAT), or the RACH transmission is received over shared spectrum that is shared by a plurality of RATs.

In some aspects, the partial RACH procedure is an uplink part of a joint uplink and downlink positioning procedure, and the PDCCH is further configured to trigger a downlink part of the joint uplink and downlink positioning procedure.

In an aspect, a base station includes a memory; a communication interface; and at least one processor communicatively coupled to the memory and the communication interface, the at least one processor configured to: receive, via the communication interface, an indication of a random access channel (RACH) transmission from the UE that is associated with a partial RACH procedure; and receive, via the communication interface, the RACH transmission based on the indication.

In some aspects, the RACH transmission is for positioning, further comprising: perform one or more positioning measurements on the RACH transmission.

In some aspects, the at least one processor is further configured to: cause the communication interface to send measurement data based on the one or more positioning measurements to a position estimation entity.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the RACH transmission is received over licensed spectrum that is licensed to a particular radio access technology (RAT), or the RACH transmission is received over shared spectrum that is shared by a plurality of RATs.

In an aspect, a position estimation entity includes a memory; a communication interface; and at least one processor communicatively coupled to the memory and the communication interface, the at least one processor configured to: receive, via the communication interface, measurement data based on one or more positioning measurements performed by a set of base stations (BSs) on a random access channel (RACH) transmission for positioning from a user equipment (UE); and determine a positioning estimate of the UE based at least in part upon the measurement data.

In some aspects, the RACH transmission is associated with a partial RACH procedure.

In some aspects, the partial RACH procedure is triggered by a physical downlink control channel (PDCCH) communication from a serving BS of the UE.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the RACH transmission for positioning is transmitted by the UE over licensed spectrum that is licensed to a particular radio access technology (RAT), or the RACH transmission is received over shared spectrum that is shared by a plurality of RATs.

In an aspect, a user equipment (UE) includes means for receiving a physical downlink control channel (PDCCH) communication; and means for triggering, in response to the PDCCH communication, a partial random access channel (RACH) procedure.

In some aspects, the partial RACH procedure comprises transmission of a RACH signal for positioning.

In some aspects, the RACH signal for positioning is targeted to a serving base station (BS) of the UE and at least one non-serving BS of the UE.

In some aspects, the triggering is responsive to a configuration of the PDCCH communication.

In some aspects, the triggering is responsive to at least one field of the PDCCH communication.

In some aspects, the at least one field comprises a radio network temporary identifier (RNTI), or the at least one field is part of a downlink control information (DCI) communication, or any combination thereof.

In some aspects, the at least one field in the DCI communication comprises a first value, the partial RACH procedure comprising a RACH transmission with a first configuration based on the first value, further comprising: means for receiving another DCI communication with the at least one field comprising a second value, the another DCI communication triggering another partial RACH procedure comprising another RACH transmission with a second configuration based on the second value.

In some aspects, the triggering is responsive to a size of the PDCCH communication.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the UE does not have an active sounding reference signal (SRS) configuration for triggering transmission of an SRS for positioning during the receiving and the triggering.

In some aspects, the partial RACH procedure comprises a RACH transmission that is transmitted on one or more beams corresponding to a plurality of synchronization signal blocks (SSBs), wherein the partial RACH procedure comprises a RACH transmission that is transmitted over one or more frequency layers on one or more respective RACH occasions, a number of the one or more frequency layers being based on a number of configured frequency layers for the UE, wherein the partial RACH procedure comprises transmission of repetitions of a RACH preamble across multiple RACH occasions, or any combination thereof.

In some aspects, the RACH procedure is based on a timing offset indicated via the PDCCH communication.

In some aspects, the RACH procedure is performed over licensed spectrum that is licensed to a particular radio access technology (RAT), or the RACH procedure is performed over shared spectrum that is shared by a plurality of RATs.

In some aspects, the partial RACH procedure is an uplink part of a joint uplink and downlink positioning procedure, and the PDCCH is further configured to trigger a downlink part of the joint uplink and downlink positioning procedure.

In some aspects, the partial RACH procedure is an uplink part of a joint uplink and downlink positioning procedure.

In an aspect, a base station includes means for transmitting, to the UE, a physical downlink control channel (PDCCH) communication configured to trigger a partial random access channel (RACH) procedure; and means for receiving, from the UE in response to the PDCCH communication, a RACH transmission.

In some aspects, the RACH transmission is for positioning, further comprising: means for performing one or more positioning measurements on the RACH transmission.

In some aspects, the RACH signal for positioning is targeted to the serving BS of the UE and at least one non-serving BS of the UE.

In some aspects, the method includes means for notifying the at least one non-serving BS or a location management function (LMF) of the partial RACH procedure to facilitate the at least one non-serving BS to perform positioning measurements on the RACH transmission.

In some aspects, the method includes means for sending measurement data based on the one or more positioning measurements to a position estimation entity.

In some aspects, the PDCCH communication is configured to trigger the partial RACH procedure based on a configuration of the PDCCH communication.

In some aspects, the PDCCH communication is configured to trigger the partial RACH procedure based on at least one field of the PDCCH communication.

In some aspects, the at least one field comprises a radio network temporary identifier (RNTI), or the at least one field is part of a downlink control information (DCI) communication, or any combination thereof.

In some aspects, the at least one field in the DCI communication comprises a first value, the RACH transmission arranged with a first configuration based on the first value, further comprising: means for transmitting another DCI communication with the at least one field comprising a second value, the another DCI communication configured to trigger another partial RACH procedure comprising another RACH transmission with a second configuration based on the second value.

In some aspects, the PDCCH communication is configured to trigger the partial RACH procedure based on a size of the PDCCH communication.

In some aspects, the partial RACH procedure is a partial 4-Step RACH procedure, wherein the partial RACH procedure comprises reception of a RACH preamble only without a RACH response to the RACH preamble.

In some aspects, the partial RACH procedure is a partial 2-Step RACH procedure, and the partial RACH procedure comprises reception of a RACH preamble and a physical uplink shared channel (PUSCH) communication without a RACH response to the RACH preamble or the PUSCH communication.

In some aspects, the UE does not have an active sounding reference signal (SRS) configuration for triggering transmission of an SRS for positioning during the transmitting and the receiving.

In some aspects, the RACH transmission is received on one or more beams corresponding to a plurality of synchronization signal blocks (SSBs), wherein the RACH transmission is received over one or more frequency layers on one or more respective RACH occasions, a number of the one or more frequency layers being based on a number of configured frequency layers for the UE, wherein the RACH transmission comprises repetitions of a RACH preamble across multiple RACH occasions, or any combination thereof.

In some aspects, the RACH procedure may be based on a timing offset indicated via the PDCCH communication.

In some aspects, the RACH transmission is received over licensed spectrum that is licensed to a particular radio access technology (RAT), or the RACH transmission is received over shared spectrum that is shared by a plurality of RATs.

In some aspects, the partial RACH procedure is an uplink part of a joint uplink and downlink positioning procedure, and the PDCCH is further configured to trigger a downlink part of the joint uplink and downlink positioning procedure.

In an aspect, a base station includes means for receiving an indication of a random access channel (RACH) transmission from the UE that is associated with a partial RACH procedure; and means for receiving the RACH transmission based on the indication.

In some aspects, the RACH transmission is for positioning, further comprising: means for performing one or more positioning measurements on the RACH transmission.

In some aspects, the method includes means for sending measurement data based on the one or more positioning measurements to a position estimation entity.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the RACH transmission is received over licensed spectrum that is licensed to a particular radio access technology (RAT), or the RACH transmission is received over shared spectrum that is shared by a plurality of RATs.

In an aspect, a position estimation entity includes means for receiving measurement data based on one or more positioning measurements performed by a set of base stations (BSs) on a random access channel (RACH) transmission for positioning from a user equipment (UE); and means for determining a positioning estimate of the UE based at least in part upon the measurement data.

In some aspects, the RACH transmission is associated with a partial RACH procedure.

In some aspects, the partial RACH procedure is triggered by a physical downlink control channel (PDCCH) communication from a serving BS of the UE.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the RACH transmission for positioning is transmitted by the UE over licensed spectrum that is licensed to a particular radio access technology (RAT), or the RACH transmission is received over shared spectrum that is shared by a plurality of RATs.

In an aspect, a non-transitory computer-readable medium storing computer-executable instructions that, when executed by a user equipment (UE), cause the UE to: receive a physical downlink control channel (PDCCH) communication; and trigger, in response to the PDCCH communication, a partial random access channel (RACH) procedure.

In some aspects, the partial RACH procedure comprises transmission of a RACH signal for positioning.

In some aspects, the RACH signal for positioning is targeted to a serving base station (BS) of the UE and at least one non-serving BS of the UE.

In some aspects, the triggering is responsive to a configuration of the PDCCH communication.

In some aspects, the triggering is responsive to at least one field of the PDCCH communication.

In some aspects, the at least one field comprises a radio network temporary identifier (RNTI), or the at least one field is part of a downlink control information (DCI) communication, or any combination thereof.

In some aspects, the at least one field in the DCI communication comprises a first value, the partial RACH procedure comprising a RACH transmission with a first configuration based on the first value, further comprising: receive another DCI communication with the at least one field comprising a second value, the another DCI communication triggering another partial RACH procedure comprising another RACH transmission with a second configuration based on the second value.

In some aspects, the triggering is responsive to a size of the PDCCH communication.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the UE does not have an active sounding reference signal (SRS) configuration for triggering transmission of an SRS for positioning during the receiving and the triggering.

In some aspects, the partial RACH procedure comprises a RACH transmission that is transmitted on one or more beams corresponding to a plurality of synchronization signal blocks (SSBs), wherein the partial RACH procedure comprises a RACH transmission that is transmitted over one or more frequency layers on one or more respective RACH occasions, a number of the one or more frequency layers being based on a number of configured frequency layers for the UE, wherein the partial RACH procedure comprises transmission of repetitions of a RACH preamble across multiple RACH occasions, or any combination thereof.

In some aspects, the RACH procedure is based on a timing offset indicated via the PDCCH communication.

In some aspects, the RACH procedure is performed over licensed spectrum that is licensed to a particular radio access technology (RAT), or the RACH procedure is performed over shared spectrum that is shared by a plurality of RATs.

In some aspects, the partial RACH procedure is an uplink part of a joint uplink and downlink positioning procedure, and the PDCCH is further configured to trigger a downlink part of the joint uplink and downlink positioning procedure.

In some aspects, the partial RACH procedure is an uplink part of a joint uplink and downlink positioning procedure.

In an aspect, a non-transitory computer-readable medium storing computer-executable instructions that, when executed by a base station, cause the base station to: transmit, to the UE, a physical downlink control channel (PDCCH) communication configured to trigger a partial random access channel (RACH) procedure; and receive, from the UE in response to the PDCCH communication, a RACH transmission.

In some aspects, the RACH transmission is for positioning, further comprising: perform one or more positioning measurements on the RACH transmission.

In some aspects, the RACH signal for positioning is targeted to the serving BS of the UE and at least one non-serving BS of the UE.

In some aspects, the one or more instructions further cause the base station to: notify the at least one non-serving BS or a location management function (LMF) of the partial RACH procedure to facilitate the at least one non-serving BS to perform positioning measurements on the RACH transmission.

In some aspects, the one or more instructions further cause the base station to: send measurement data based on the one or more positioning measurements to a position estimation entity.

In some aspects, the PDCCH communication is configured to trigger the partial RACH procedure based on a configuration of the PDCCH communication.

In some aspects, the PDCCH communication is configured to trigger the partial RACH procedure based on at least one field of the PDCCH communication.

In some aspects, the at least one field comprises a radio network temporary identifier (RNTI), or the at least one field is part of a downlink control information (DCI) communication, or any combination thereof.

In some aspects, the at least one field in the DCI communication comprises a first value, the RACH transmission arranged with a first configuration based on the first value, further comprising: transmit another DCI communication with the at least one field comprising a second value, the another DCI communication configured to trigger another partial RACH procedure comprising another RACH transmission with a second configuration based on the second value.

In some aspects, the PDCCH communication is configured to trigger the partial RACH procedure based on a size of the PDCCH communication.

In some aspects, the partial RACH procedure is a partial 4-Step RACH procedure, wherein the partial RACH procedure comprises reception of a RACH preamble only without a RACH response to the RACH preamble.

In some aspects, the partial RACH procedure is a partial 2-Step RACH procedure, and the partial RACH procedure comprises reception of a RACH preamble and a physical uplink shared channel (PUSCH) communication without a RACH response to the RACH preamble or the PUSCH communication.

In some aspects, the UE does not have an active sounding reference signal (SRS) configuration for triggering transmission of an SRS for positioning during the transmitting and the receiving.

In some aspects, the RACH transmission is received on one or more beams corresponding to a plurality of synchronization signal blocks (SSBs), wherein the RACH transmission is received over one or more frequency layers on one or more respective RACH occasions, a number of the one or more frequency layers being based on a number of configured frequency layers for the UE, wherein the RACH transmission comprises repetitions of a RACH preamble across multiple RACH occasions, or any combination thereof.

In some aspects, the RACH procedure may be based on a timing offset indicated via the PDCCH communication.

In some aspects, the RACH transmission is received over licensed spectrum that is licensed to a particular radio access technology (RAT), or the RACH transmission is received over shared spectrum that is shared by a plurality of RATs.

In some aspects, the partial RACH procedure is an uplink part of a joint uplink and downlink positioning procedure, and the PDCCH is further configured to trigger a downlink part of the joint uplink and downlink positioning procedure.

In an aspect, a non-transitory computer-readable medium storing computer-executable instructions that, when executed by a base station, cause the base station to: receive an indication of a random access channel (RACH) transmission from the UE that is associated with a partial RACH procedure; and receive the RACH transmission based on the indication.

In some aspects, the RACH transmission is for positioning, further comprising: perform one or more positioning measurements on the RACH transmission.

In some aspects, the one or more instructions further cause the base station to: send measurement data based on the one or more positioning measurements to a position estimation entity.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the RACH transmission is received over licensed spectrum that is licensed to a particular radio access technology (RAT), or the RACH transmission is received over shared spectrum that is shared by a plurality of RATs.

In an aspect, a non-transitory computer-readable medium storing computer-executable instructions that, when executed by a position estimation entity, cause the position estimation entity to: receive measurement data based on one or more positioning measurements performed by a set of base stations (BSs) on a random access channel (RACH) transmission for positioning from a user equipment (UE); and determine a positioning estimate of the UE based at least in part upon the measurement data.

In some aspects, the RACH transmission is associated with a partial RACH procedure.

In some aspects, the partial RACH procedure is triggered by a physical downlink control channel (PDCCH) communication from a serving BS of the UE.

In some aspects, the partial RACH procedure is a partial 4-Step RACH procedure, wherein the partial RACH procedure comprises transmission of a RACH preamble only without a RACH response to the RACH preamble.

In some aspects, the partial RACH procedure is a partial 2-Step RACH procedure, and the partial RACH procedure comprises transmission of a RACH preamble and a physical uplink shared channel (PUSCH) communication without a RACH response to the RACH preamble or the PUSCH communication.

In some aspects, the RACH transmission for positioning is transmitted by the UE over licensed spectrum that is licensed to a particular radio access technology (RAT), or the RACH transmission is received over shared spectrum that is shared by a plurality of RATs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
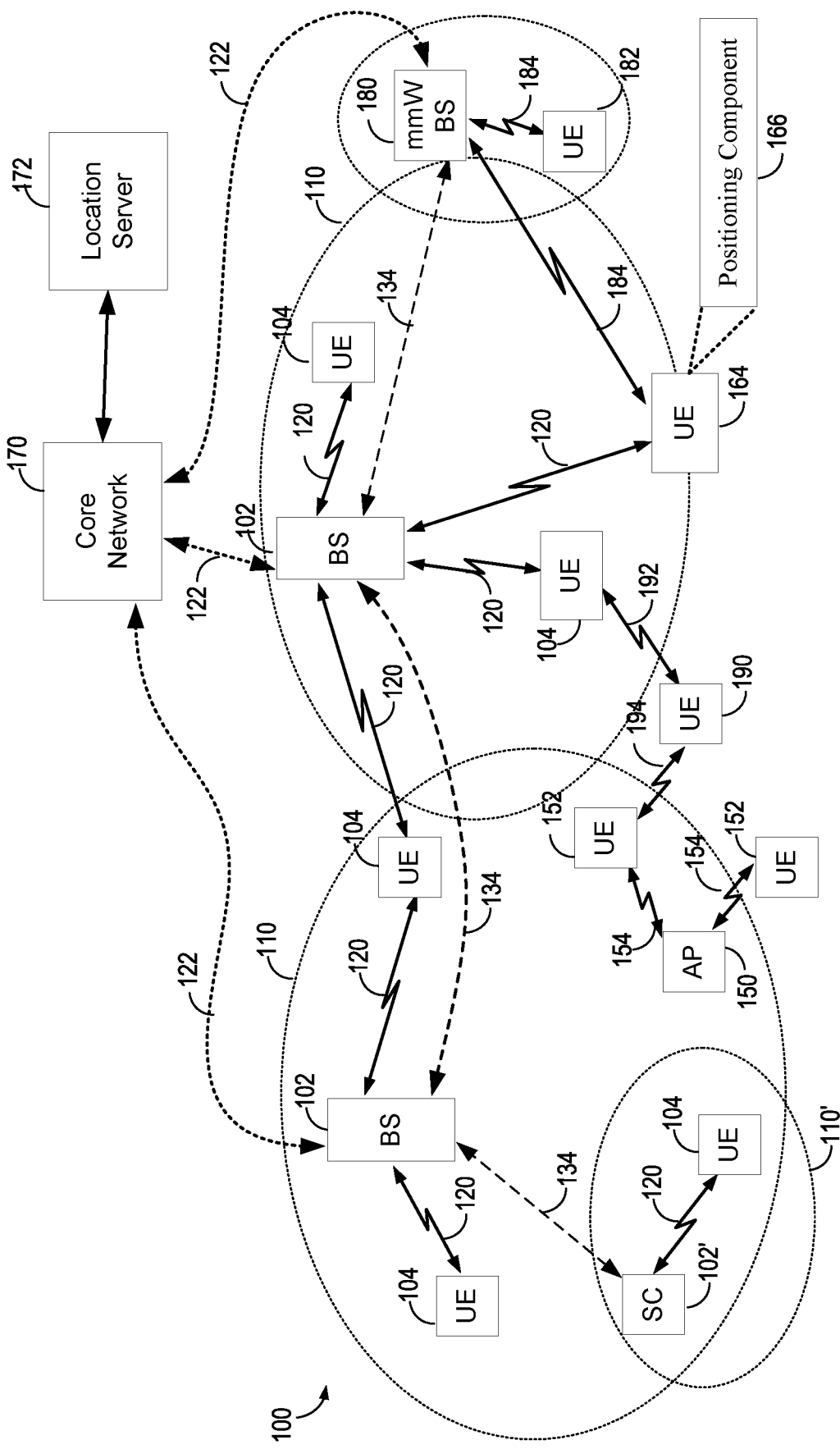
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNB s where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a positioning component 166 that may enable the UE 164 to perform the UE operations described herein. Note that although only one UE in FIG. 1 is illustrated as having fully staggered SRS component 166, any of the UEs in FIG. 1 may be configured to perform the UE operations described herein.

Figure 2A:
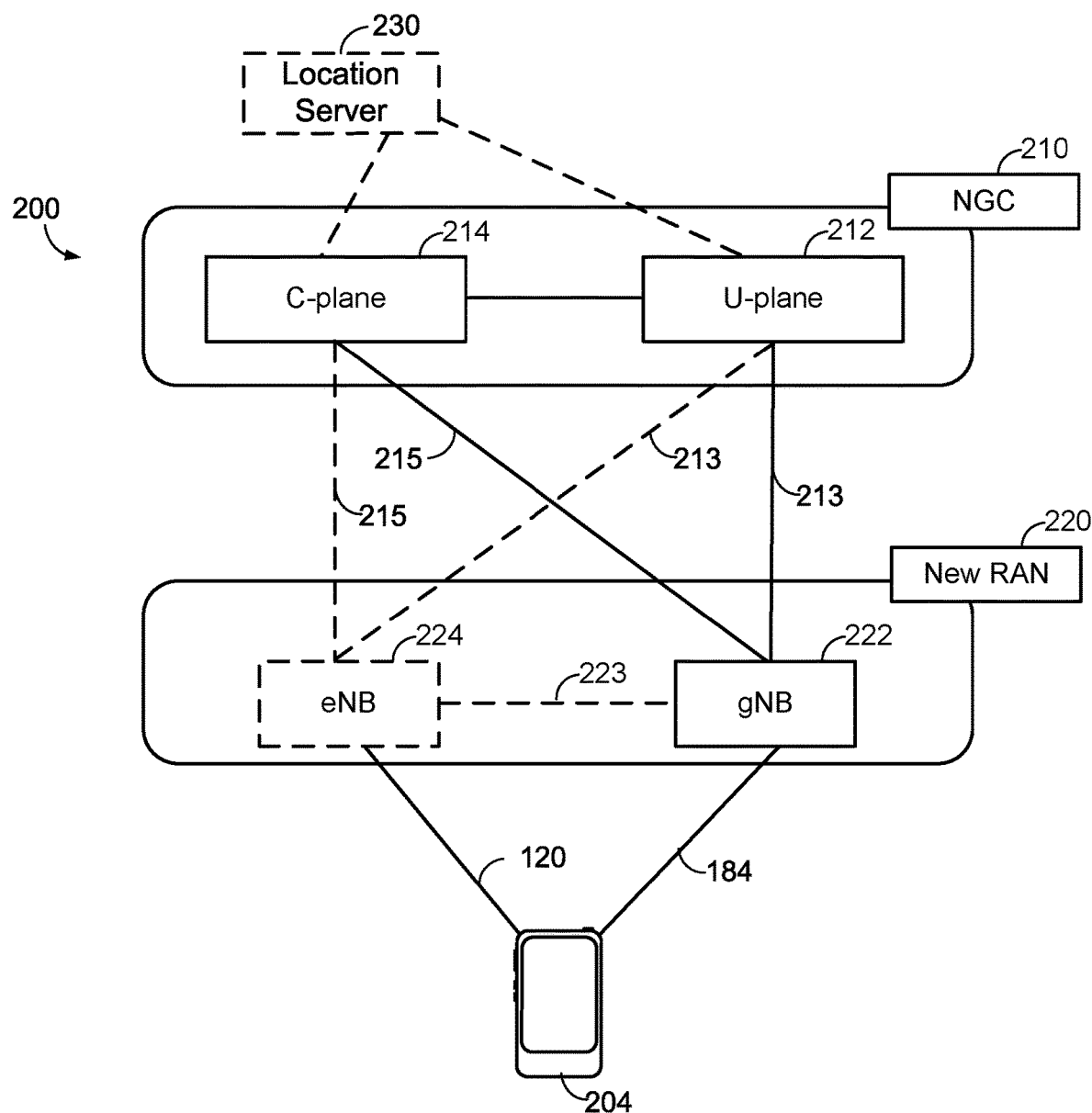
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNB s 222, while other configurations include one or more of both eNB s 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
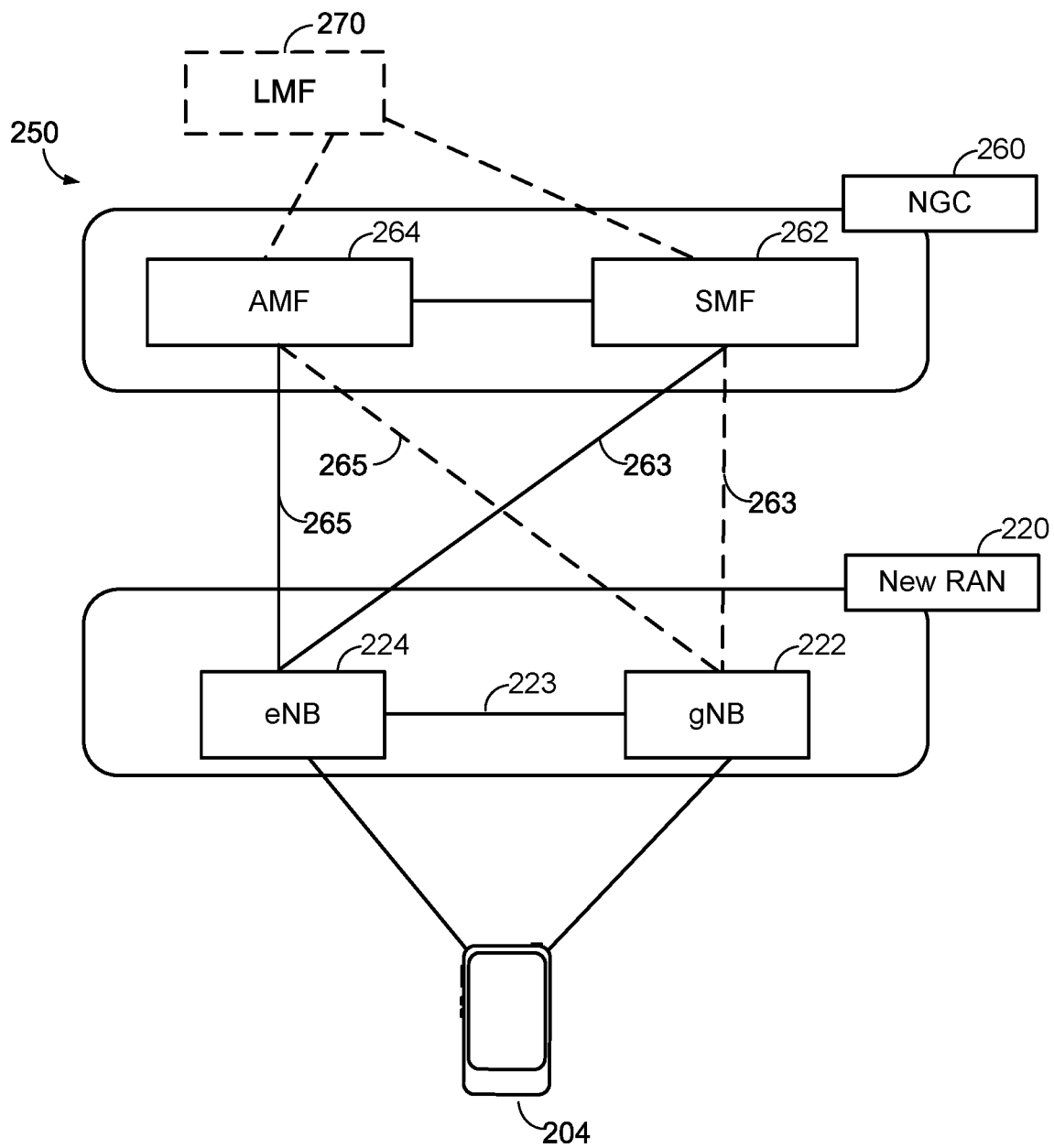

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
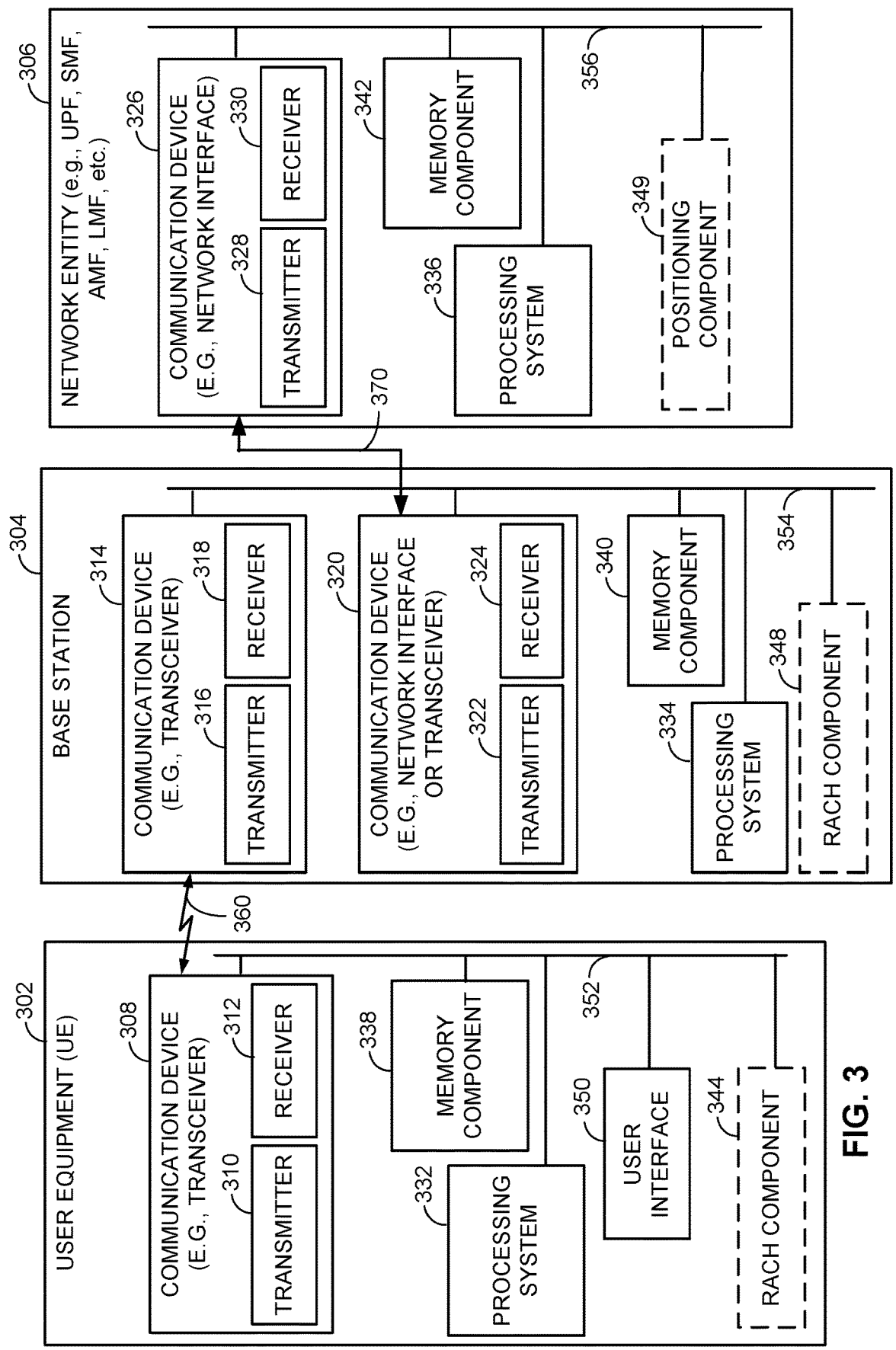
FIG. 3 is a block diagram illustrating an exemplary UE, according to various aspects.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such as a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for a radio resource control (RRC) layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302, 304 and 306 may include RACH components 344, 348 and positioning component 349, respectively. It will be appreciated the functionality of the various components 344, 348 and 349 may differ based on the device where it is being implemented. The RACH components 344, 348 and positioning component 349 may be hardware circuits that are part of or coupled to the processing systems 332, 334, and 336, respectively, that, when executed, cause the apparatuses 302, 304, and 306 to perform the functionality described herein. Alternatively, the RACH components 344, 348 and positioning component 349 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, 342, and 349 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, RACH components 344, 348 and positioning component 349, etc.

Figure 4A:
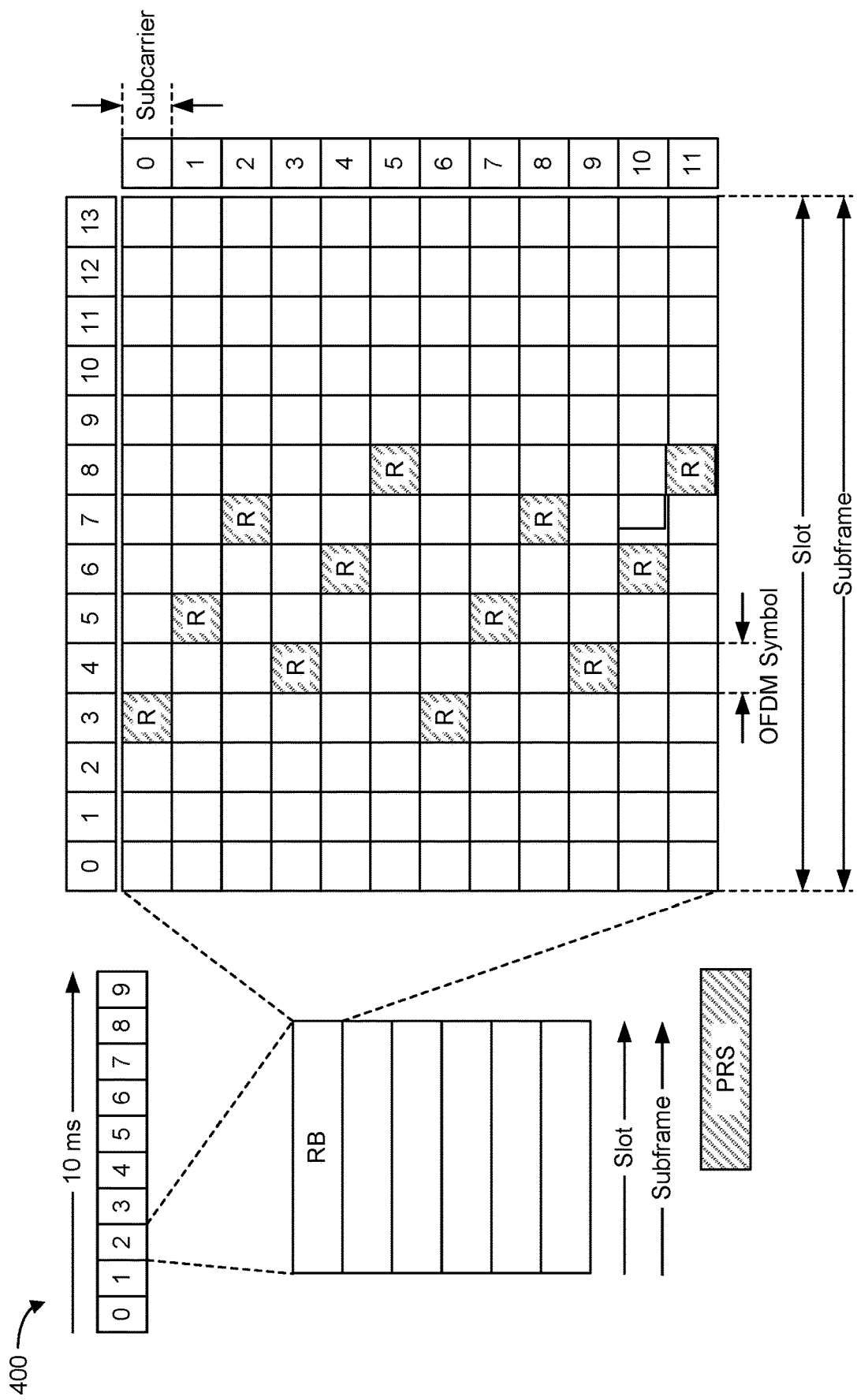
FIGS. 4A to 4D are diagrams illustrating example frame structures and channels within the frame structures, according to aspects of the disclosure.
Figure 4B:
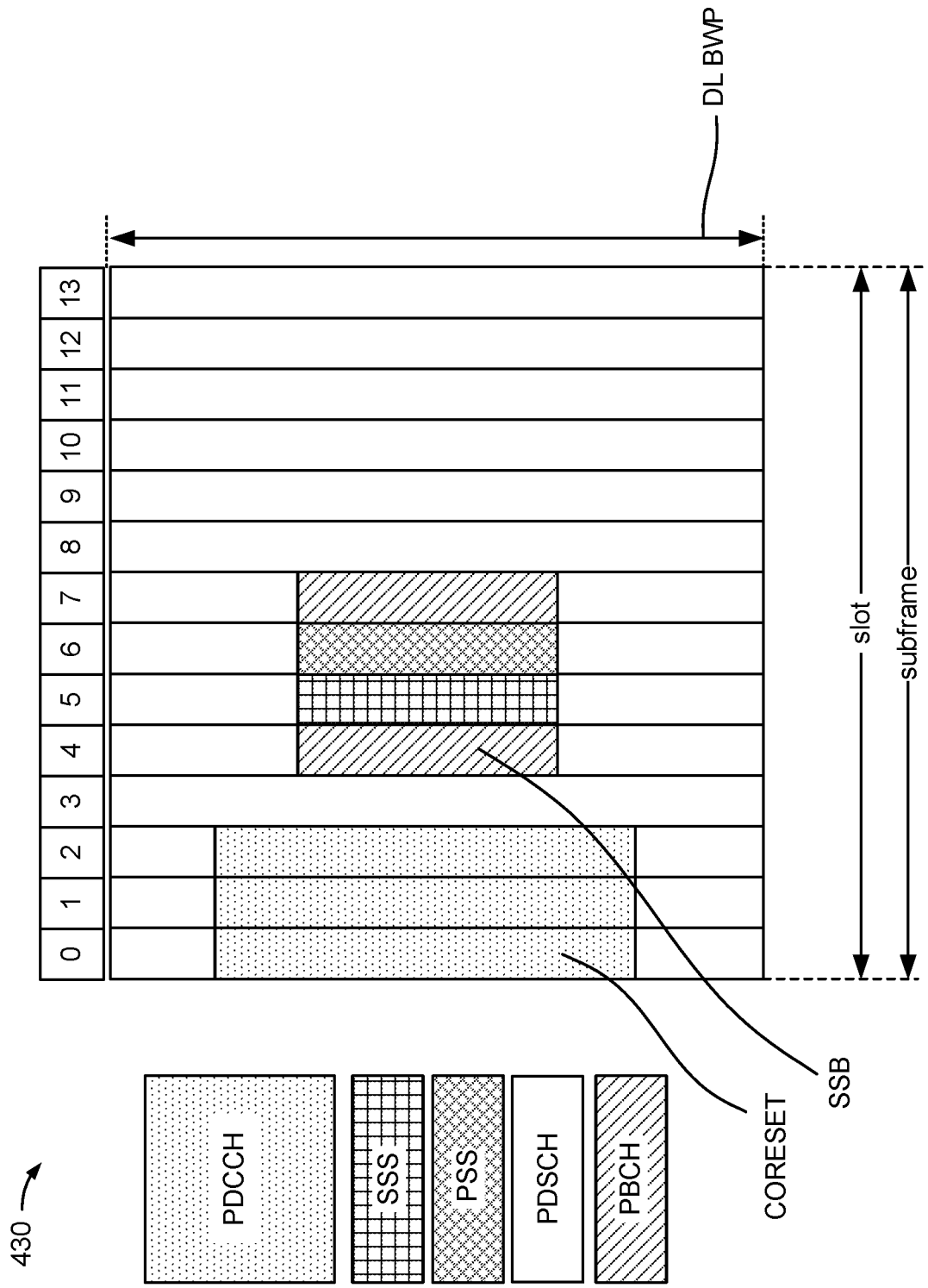
Figure 4C:
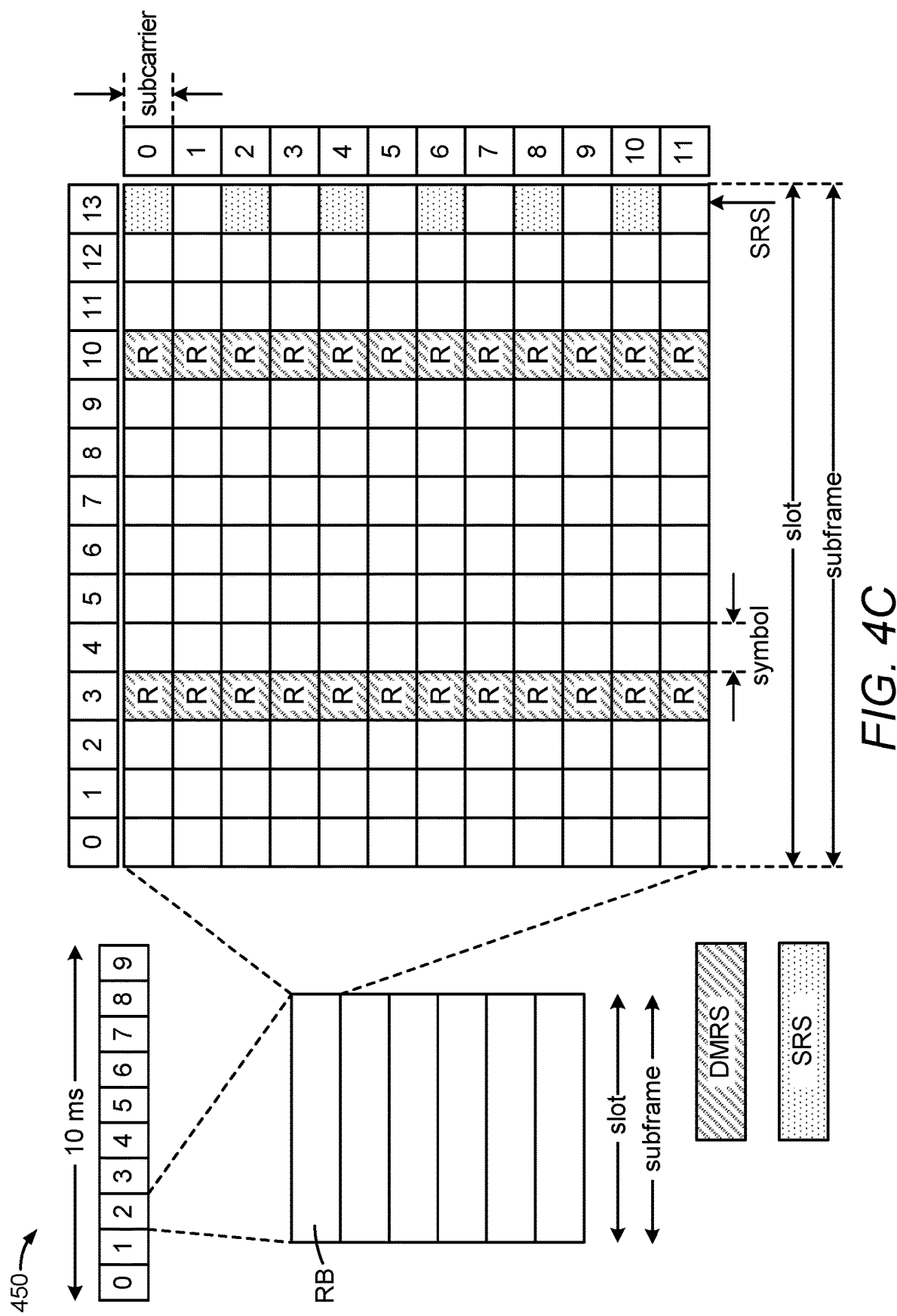
Figure 4D:
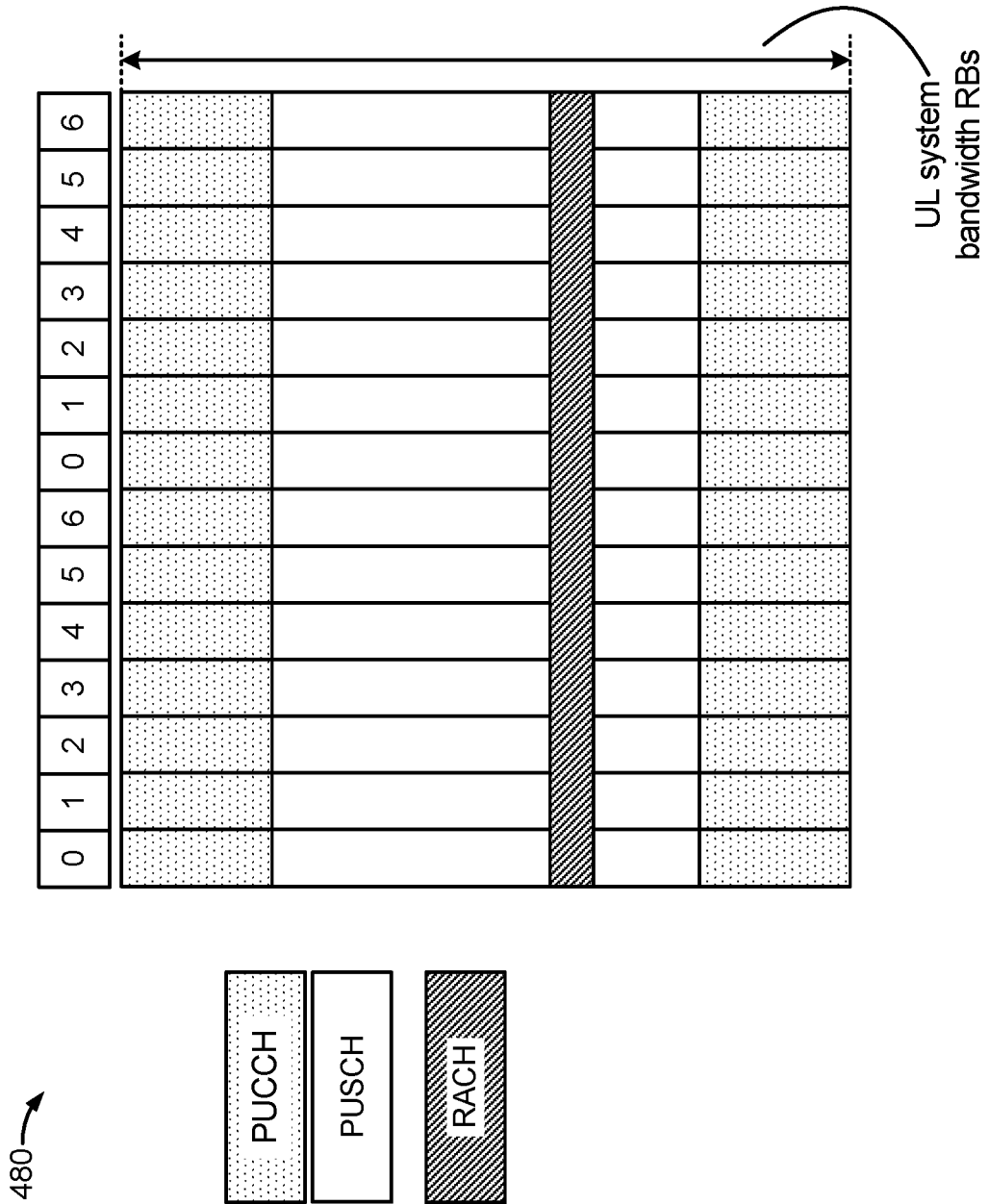

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (R), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

"PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 4-symbol comb-2: {0, 1, 0, 1}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

An SRS is an uplink-only signal that a UE transmits to help the base station obtain the channel state information (CSI) for each user. Channel state information describes how an RF signal propagates from the UE to the base station and represents the combined effect of scattering, fading, and power decay with distance. The system uses the SRS for resource scheduling, link adaptation, massive MIMO, beam management, etc.

Several enhancements over the previous definition of SRS have been proposed for SRS for positioning (SRS-P), such as a new staggered pattern within an SRS resource, a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a DL RS from a neighboring TRP. Further still, one SRS resource may be transmitted outside the active bandwidth part (BWP), and one SRS resource may span across multiple component carriers. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or downlink control information (DCI)).

As noted above, sounding reference signals (SRS) in NR are UE-specifically configured reference signals transmitted by the UE used for the purposes of the sounding the uplink radio channel. Similar to CSI-RS, such sounding provides various levels of knowledge of the radio channel characteristics. On one extreme, the SRS can be used at the gNB simply to obtain signal strength measurements, e.g., for the purposes of UL beam management. On the other extreme, SRS can be used at the gNB to obtain detailed amplitude and phase estimates as a function of frequency, time and space. In NR, channel sounding with SRS supports a more diverse set of use cases compared to LTE (e.g., downlink CSI acquisition for reciprocity-based gNB transmit beamforming (downlink MIMO); uplink CSI acquisition for link adaptation and codebook/non-codebook based precoding for uplink MIMO, uplink beam management, etc.).

The SRS can be configured using various options. The time/frequency mapping of an SRS resource is defined by the following characteristics.

Time duration $N_{symb}^{SRS}$—The time duration of an SRS resource can be 1, 2, or 4 consecutive OFDM symbols within a slot, in contrast to LTE which allows only a single OFDM symbol per slot.

Starting symbol location $l_0$—The starting symbol of an SRS resource can be located anywhere within the last 6 OFDM symbols of a slot provided the resource does not cross the end-of-slot boundary.

Repetition factor R—For an SRS resource configured with frequency hopping, repetition allows the same set of subcarriers to be sounded in R consecutive OFDM symbols before the next hop occurs (as used herein, a "hop" refers to specifically to a frequency hop). For example, values of R are 1, 2, 4 where $R \leq N_{symb}^{SRS}$.

Transmission comb spacing $K_{TC}$ and comb offset $k_{TC}$—An SRS resource may occupy resource elements (REs) of a frequency domain comb structure, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0,1, . . . , $K_{TC}$–1 REs. Thus, for comb spacing $K_{TC}$=2, there are 2 different combs available for multiplexing if needed, and for comb spacing $K_{TC}$=4, there are 4 different available combs.

Periodicity and slot offset for the case of periodic/semi-persistent SRS.

Sounding bandwidth within a bandwidth part.

For low latency positioning, a gNB may trigger a UL SRS-P via a DCI (e.g., transmitted SRS-P may include repetition or beam-sweeping to enable several gNBs to receive the SRS-P). Alternatively, the gNB may send information regarding aperiodic PRS transmission to the UE (e.g., this configuration may include information about PRS from multiple gNBs to enable the UE to perform timing computations for positioning (UE-based) or for reporting (UE-assisted).

Figure 5:
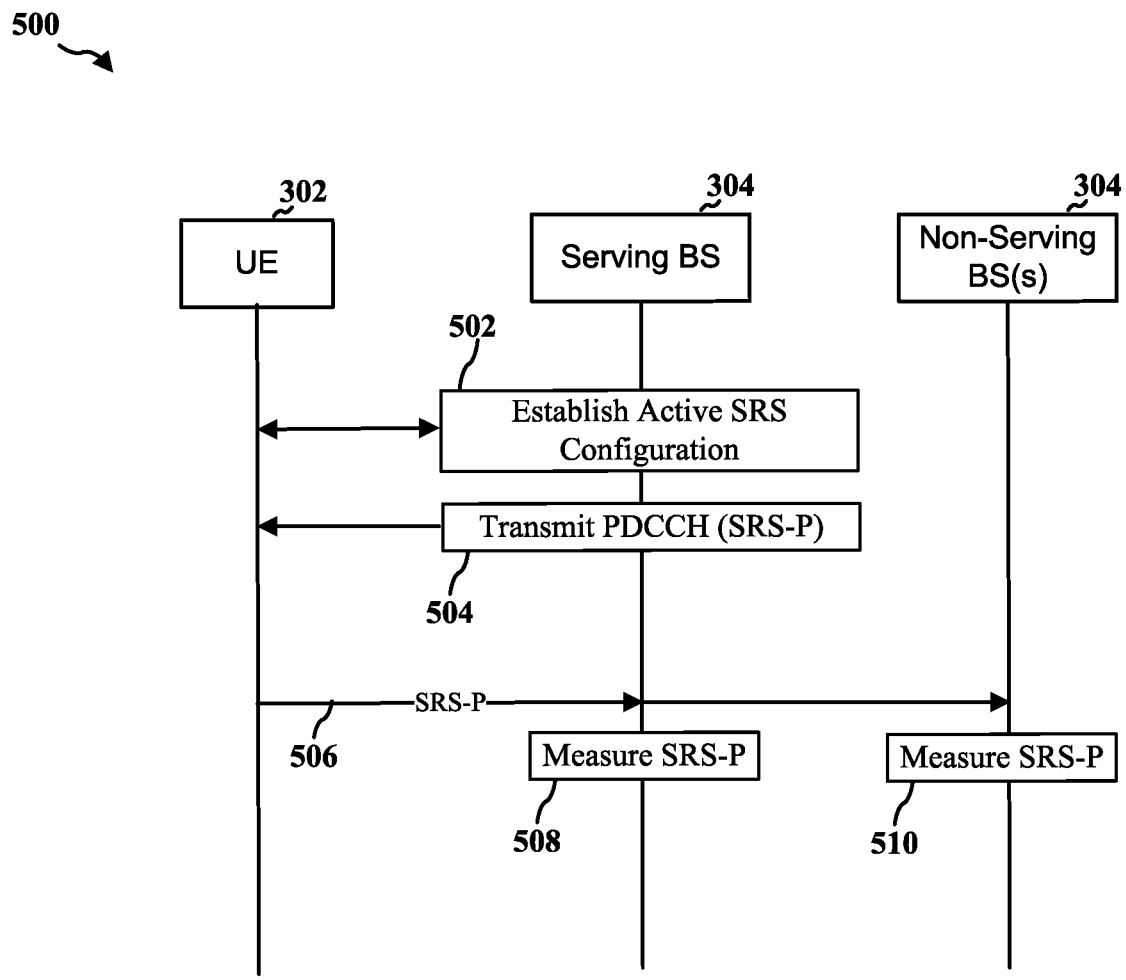
FIG. 5 illustrates a DCI-triggered SRS-P procedure in accordance with an aspect of the disclosure.

FIG. 5 illustrates a DCI-triggered SRS-P procedure 500 in accordance with an aspect of the disclosure. At 502, an active SRS configuration is established between a serving BS 304 and UE 302. At 504, the serving BS 304 leverages the active SRS configuration established at 502 to transmit a DCI comprising a PDCCH that is configured to trigger an SRS-P. At 506, UE 302 transmits the SRS-P in response to the PDCCH. The serving BS 304 and one or more non-serving BSs 304 measure the SRS-P at 508-510, respectively.

In some scenarios, it may be possible that the UE does not have an active SRS configuration which can be utilized by the gNB to immediately trigger an SRS transmission. Embodiments of the disclosure are thereby directed to a Random Access Channel (RACH) transmission for positioning (e.g., a RACH preamble transmission), which in some designs may be part of a partial RACH procedure that corresponds to a limited or truncated version of a 'normal' RACH procedure. Such embodiments may provide various technical advantages, such as obtaining a coarse positioning estimate for the UE with lower latency (e.g., particularly for scenarios where active SRS configuration is not setup for the UE). Below, complete RACH (or PRACH) procedures are described with respect to FIGS. 6-7, followed by a discussion of partial RACH procedures in accordance with various aspects of the disclosure.

Figure 6:
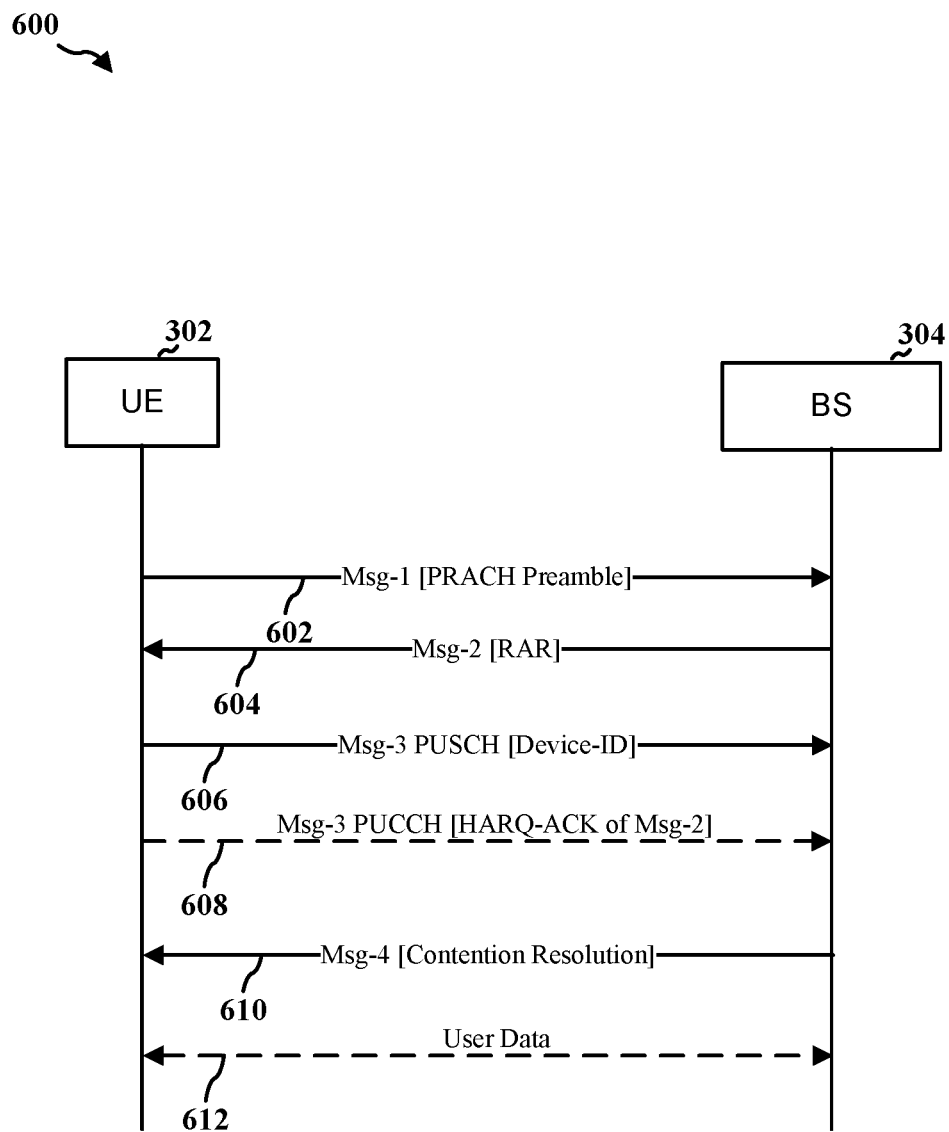
FIG. 6 illustrates a 4-Step Physical Random Access Channel (PRACH) procedure in accordance with an embodiment of the disclosure.

FIG. 6 illustrates a 4-Step Physical Random Access Channel (PRACH) procedure 600 in accordance with an embodiment of the disclosure. The 4-Step PRACH procedure 600 is an initial access procedure by which a UE (e.g., UE 302) can initiate communication with a BS (e.g., BS 304).

Referring to FIG. 6, at 602, a Message 1 ("Msg-1") of the 4-Step PRACH procedure 600 is transmitted by UE 302 to BS 304. The Msg-1 of 602 may be characterized herein as a PRACH preamble (or more generally as a RACH preamble). In an example, the Msg-1 of 602 may be implemented a Zadoff-Chu sequence which indicates the presence of a random access attempt and allows BS 304 to perform channel estimation between BS 304 and UE 302.

Referring to FIG. 6, at 604, a Message 2 ("Msg-2") of the 4-Step PRACH procedure 600 is transmitted by BS 304 to UE 302. The Msg-2 of 604 may be characterized herein as a random access response (RAR). For example, in response to the detected PRACH preamble (or Msg-1) at 602, BS 304 may transmit the Msg-2 of 604 on a downlink (DL) shared channel (SCH) comprising any combination of:

An index of the detected PRACH preamble (or Msg-1) from 602,

An uplink timing correction for UE 302.

A scheduling grant indicating what resource(s) UE 302 should use for transmission of Message 3 ("Msg-3") of the 4-Step PRACH procedure 600, and A Temporary Cell Radio Network Temporary Identifier (TC-RNTI) used for further communication between UE 302 and BS 304.

In an example, the Msg-2 of 604 may be scheduled on the SL SCH and indicated on a Physical Downlink Control Channel (PDCCH) using an identity (e.g., a Random Access RNTI (RA-RNTI) which is indicated by the time and frequency resource(s) upon which the PRACH preamble (or Msg-1) from 602 is transmitted.

Referring to FIG. 6, at 606, a Message 3 ("Msg-3") comprising at least a UE identifier (ID) of UE 302 is transmitted by UE 302 to BS 304. In some designs, the Msg-3 is transmitted over Physical Uplink Shared Channel (PUSCH) and may be referred to as a Msg-3 PUSCH. In an example, the Msg-3 transmitted at 606 may be transmitted via the UL SCH resource(s) indicated by the Msg-2 from 604. In some designs, device scrambling is used for the transmission of Msg-3 at 606 (e.g., scrambling based on the TC-RNTI assigned via the Msg-2 from 604). In some designs, if UE 302 is in a radio resource control (RRC)-Connected state with a C-RNTI already assigned thereto, the C-RNTI may be used as the UE-ID in the Msg-3 at 606. In some designs, if UE 302 is not in a RRC-Connected state, a core network device identifier such as a 40-bit Serving Temporary Mobile Subscriber Identity (S-TMSI) can be used as the UE-ID in the Msg-3 at 606.

Referring to FIG. 6, at 608, another Msg-3 is optionally transmitted as a hybrid automatic repeat request (HARQ) acknowledgment (ACK) to the Msg-2 from 604. In some designs, the Msg-3 is transmitted via PUCCH and may be referred to as a Msg-3 PUCCH. In some designs, whether or not the Msg-3 PUCCH is transmitted at 608 may be configured via RRC signaling or via one or more information elements (IEs) in a system information block (SIB).

Referring to FIG. 6, at 610, a Message 4 ("Msg-4") of the 4-Step PRACH procedure 600 is transmitted by BS 304 to UE 302. In some designs, the Msg-4 of 608 comprises a downlink message for contention resolution as there is some probability of contention associated with the Msg-3 transmissions at 606-608. For example, if multiple UEs transmit the same Msg-1 (602) at the same time, then the multiple UEs may react to the same Msg-2 (604) such that a collision occurs. In some designs, if UE 302 already has a C-RNTI assigned, contention resolution may be handled by addressing UE 302 on the PDCCH using the C-RNTI. In some designs, if UE 302 does not have a valid C-RNTI (e.g., UE 302 is RRC-Idle prior to 602), Msg-4 contention resolution may be handled by addressing UE 302 on the PDCCH using the TC-RNTI, with UE 302 comparing (i) the UE-ID received within a PDSCH scheduled by the PDCCH of Msg-4 with (ii) the UE-ID transmitted in the Msg-3 PUSCH at 606, so as to determine the 4-Step PRACH procedure 600 successful if a match is observed, after which the C-RNTI is confirmed as C-RNTI. At 612, UE 302 and BS 304 may optionally exchange user data.

Figure 7:
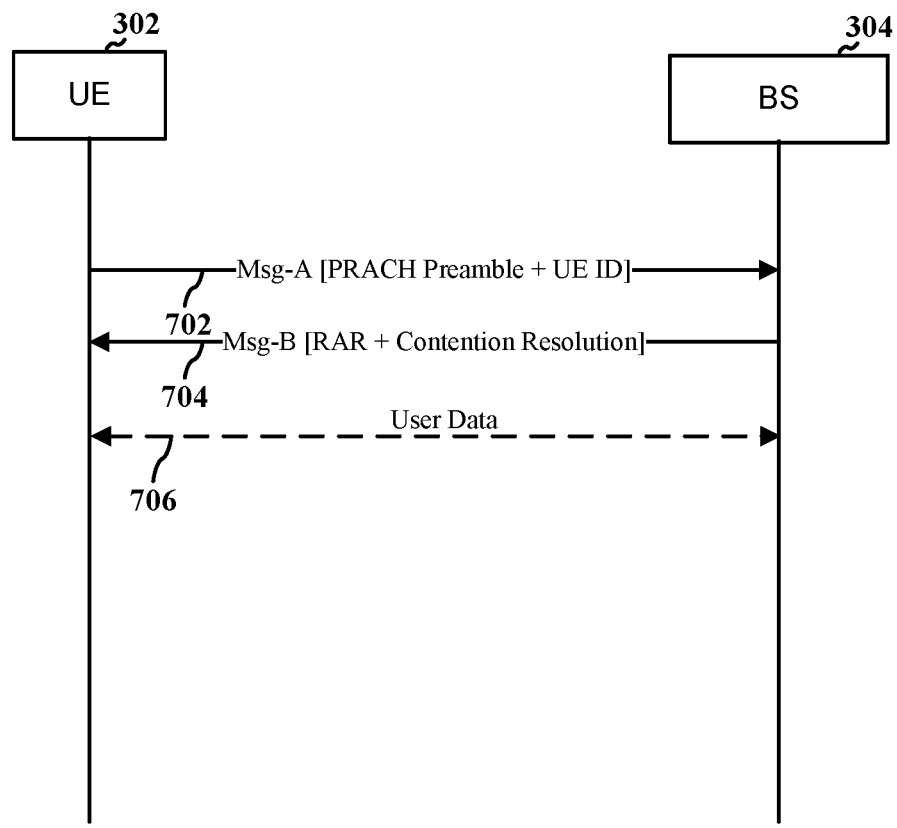
FIG. 7 illustrates a 2-Step PRACH procedure in accordance with an embodiment of the disclosure.

FIG. 7 illustrates a 2-Step PRACH procedure 700 in accordance with an embodiment of the disclosure. Similar to the 4-Step PRACH procedure 600, the 2-Step PRACH procedure 700 is an initial access procedure by which a UE (e.g., UE 302) can initiate communication with a BS (e.g., BS 304). However, in the 2-Step PRACH procedure 700, the Msg-1 and Msg-3 (PUSCH) are transmitted to the BS 304 before any response from the BS 304 is transmitted as 'Msg-A', and the BS 304 sends 'Msg-B' (e.g., comprising Msg-2 and Msg-4) back to the UE 302.

Referring to FIG. 7, at 702, UE 302 transmits Msg-A (e.g., a PRACH preamble and associated UE ID information or PUSCH as in Msg-1 and Msg-3) to BS 304. At 704, BS 304 transmits Msg-B (e.g., a RAR along with contention resolution as in Msg-2 and Msg-4) to BS 304. At 706, UE 302 and BS 304 may optionally exchange user data. The processing of the Msg-A and Msg-B is otherwise comparable to the processing of the Msg-1, Msg-2, Msg-3 and Msg-4 in the 4-Step PRACH procedure 600 of FIG. 6.

In some designs, a 2-Step or 4-Step RACH procedure may be triggered by a PDCCH instruction. For a PRACH transmission triggered by a PDCCH order, the PRACH mask index field [5, TS 38.212], if the value of the random access preamble index field is not zero, indicates the PRACH occasion for the PRACH transmission where the PRACH occasions are associated with the SS/PBCH block index indicated by the SS/PBCH block index field of the PDCCH order. If random access is triggered by PDCCH order, the UE, if requested via higher layer signals, transmits a PRACH in the selected PRACH occasion [TS 38.321], for which a time between the last symbol of the PDCCH order reception and the first symbol of the PRACH transmission is $>=N_{T,2}+\Delta_{BWPSwitch}+\Delta_{Delay}$, where the parameters are defined in TS 38.213 Section 8.1.

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

Random Access Preamble index—6 bits according to ra-PreambleIndex in Clause 5.1.2 of [8, TS38.321]

UL/SUL indicator—1 bit. If the value of the "Random Access Preamble index" is not all zeros and if the UE is configured with supplementary Uplink in Serving-CellConfig in the cell, this field indicates which UL carrier in the cell to transmit the PRACH according to Table 7.3.1.1.1-1; otherwise, this field is reserved.

SS/PBCH index—6 bits. If the value of the "Random Access Preamble index" is not all zeros, this field indicates the SS/PBCH that shall be used to determine the RACH occasion for the PRACH transmission; otherwise, this field is reserved.

PRACH Mask index—4 bits. If the value of the "Random Access Preamble index" is not all zeros, this field indicates the RACH occasion associated with the SS/PBCH indicated by "SS/PBCH index" for the PRACH transmission, according to Clause 5.1.1 of [8, TS38.321]; otherwise, this field is reserved Reserved bits—12 bits for operation in a cell with shared spectrum channel access; otherwise 10 bits.

As will be described below in more detail with respect to various embodiments of the disclosure, a modified version of a PDCCH-triggered RACH procedure may be implemented whereby a partial RACH procedure is triggered by PDCCH rather than complete RACH procedure. In some designs, the partial RACH procedure may particularly be used for positioning. As noted above, such embodiments provide the technical advantage of providing a coarse location estimate for the more quickly particularly in scenarios where an active SRS configuration is not setup for the UE. Moreover, the use of a partial RACH procedure rather than a full RACH procedure may reduce system overhead and improve spectral efficiency (e.g., because only the RACH/PRACH preamble or Msg-1/Msg-A need be transmitted).

Figure 8:
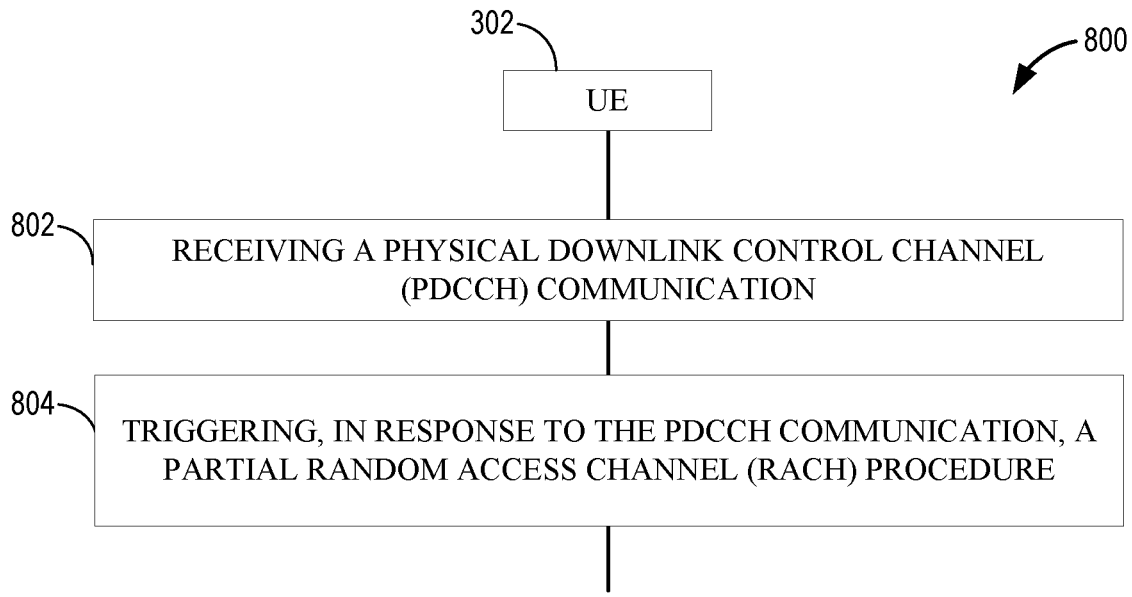
FIG. 8 illustrates an exemplary process of wireless communication, according to aspects of the disclosure.

FIG. 8 illustrates an exemplary process 800 of wireless communication, according to aspects of the disclosure. The process 800 may be performed by UE 302.

At 802, UE 302 (e.g., receiver 312, etc.) receives a PDCCH communication. For example, the PDCCH communication may be received from a serving BS 304 as part of a DCI communication. In an example, the means for performing the reception of 802 may include the receiver 312.

At 804, UE 302 (e.g., RACH component 344, processing system 332, transmitter 310, etc.) transmits, in response to the PDCCH communication, a partial RACH procedure. In an example, the partial RACH procedure may comprise transmission of a RACH signal for positioning (e.g., a Msg-1 or Msg-A transmission), while the partial RACH procedure is limited relative to the RACH procedures 600-700 in the sense that the RACH procedure stops after the RACH preamble transmission (e.g., Msg-2, Msg-3, Msg-4 are not transmitted for 4-Step PRACH procedure, or Msg-B is not transmitted for 2-Step PRACH procedure). In other designs, the partial RACH procedure may be triggered for a purpose unrelated to positioning, such as coverage enhancement or UL beam sounding, or alternatively as a combination of both positioning and coverage enhancement or UL beam sounding. In an example, the means for performing the transmission of 804 may include the transmitter 310.

Figure 9:
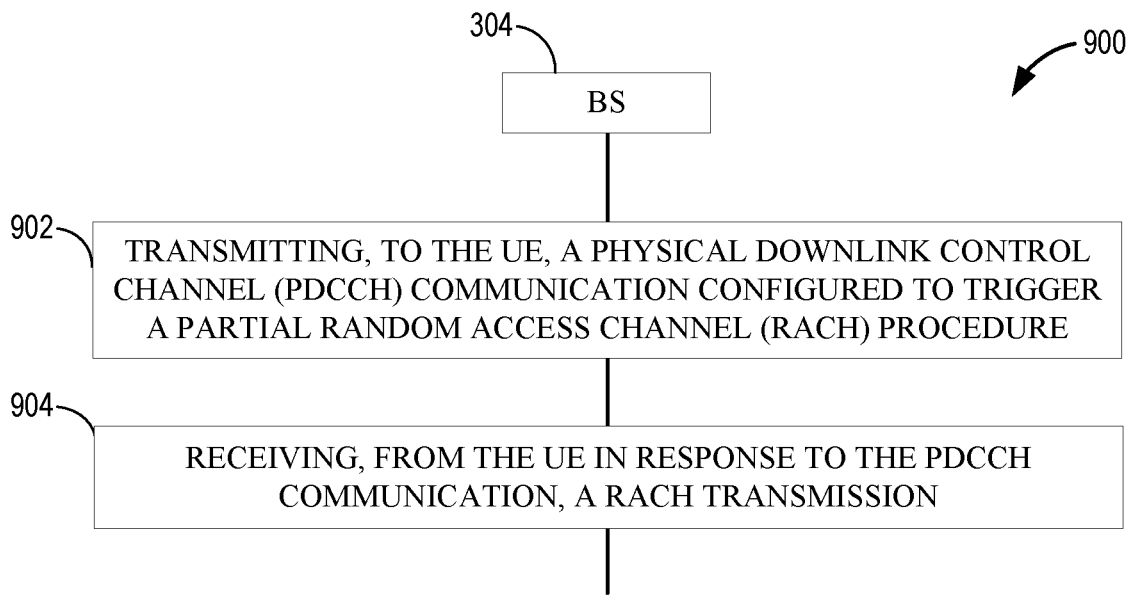
FIG. 9 illustrates an exemplary process of wireless communication, according to aspects of the disclosure.

FIG. 9 illustrates an exemplary process 900 of wireless communication, according to aspects of the disclosure. The process 900 may be performed by BS 304, which may be a serving BS of UE 302.

At 902, BS 304 (e.g., transmitter 316, etc.) transmits to UE 302, a PDDCH communication configured to trigger a partial RACH procedure. In an example, the means for performing the transmission of 902 may include the transmitter 316.

At 904, BS 304 (e.g., receiver 318, etc.) receives, from UE 302 in response to the PDCCH communication, a RACH transmission. In an example, the RACH transmission may correspond to a Msg-1 or Msg-A transmission, while the partial RACH procedure is limited relative to the RACH procedures 600-700 in the sense that the RACH procedure stops after the RACH preamble transmission (e.g., Msg-2, Msg-3, Msg-4 are not transmitted for 4-Step PRACH procedure, or Msg-B is not transmitted for 2-Step PRACH procedure). In some designs, the RACH transmission may correspond to a RACH transmission for positioning, with the BS 304 performing positioning measurements thereon. In other designs, the partial RACH procedure may be triggered for a purpose unrelated to positioning, such as coverage enhancement or UL beam sounding, or alternatively as a combination of both positioning and coverage enhancement or UL beam sounding. In some designs where the RACH transmission is a RACH transmission for positioning, the BS 304 may notify (e.g., via a backhaul connection) one or more non-serving BSs of 302 with regard to the RACH transmission so that the non-serving BS(s) may also perform positioning measurements on the RACH transmission (e.g., which may be reported to a position estimation entity, such as LMF integrated with BS 304 or remote from BS 304). In an example, the means for performing the reception of 904 may include the receiver 318.

Figure 10:
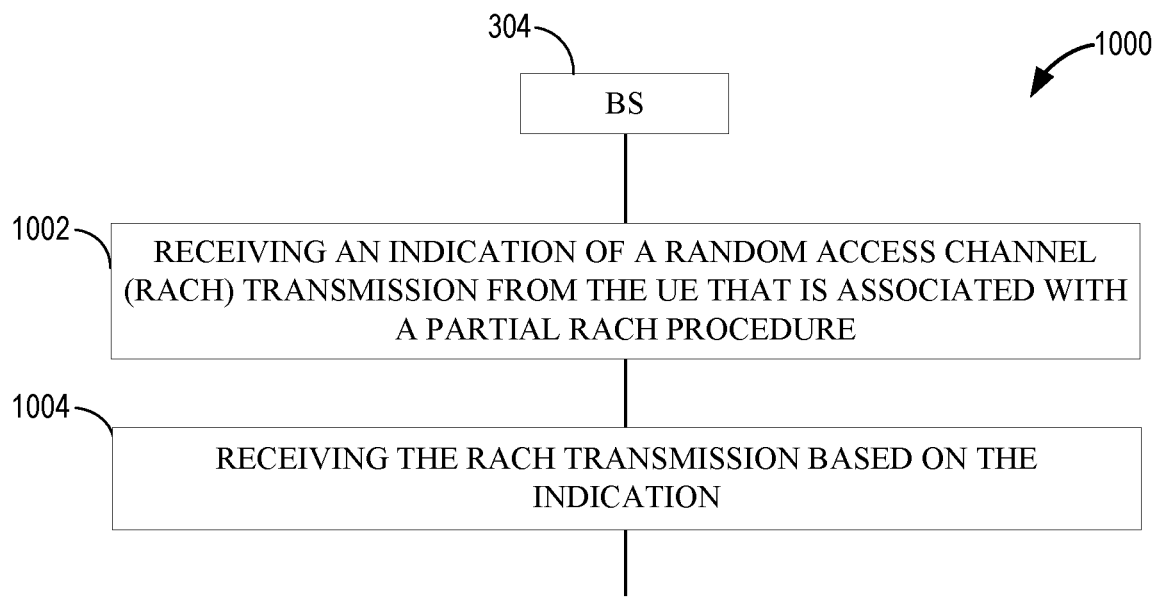
FIG. 10 illustrates an exemplary process of wireless communication, according to aspects of the disclosure.

FIG. 10 illustrates an exemplary process 1000 of wireless communication, according to aspects of the disclosure. The process 1000 may be performed by BS 304, which may be a non-serving BS of UE 302.

At 1002, BS 304 (e.g., receiver 324, etc.) receives an indication of a RACH transmission from the UE that is associated with a partial RACH procedure. In some designs, the indication of 1002 may be received from a serving BS of UE 302 via a backhaul connection. In an example, the means for performing the reception of 1002 may include the receiver 324.

At 1004, BS 304 (e.g., receiver 318, etc.) receives the RACH transmission based on the indication.). In some designs, the RACH transmission may correspond to a RACH transmission for positioning, with the BS 304 performing positioning measurements thereon (e.g., which may be reported to a position estimation entity, such as LMF integrated with BS 304 or remote from BS 304). In an example, the means for performing the reception of 1004 may include the receiver 318.

Figure 11:
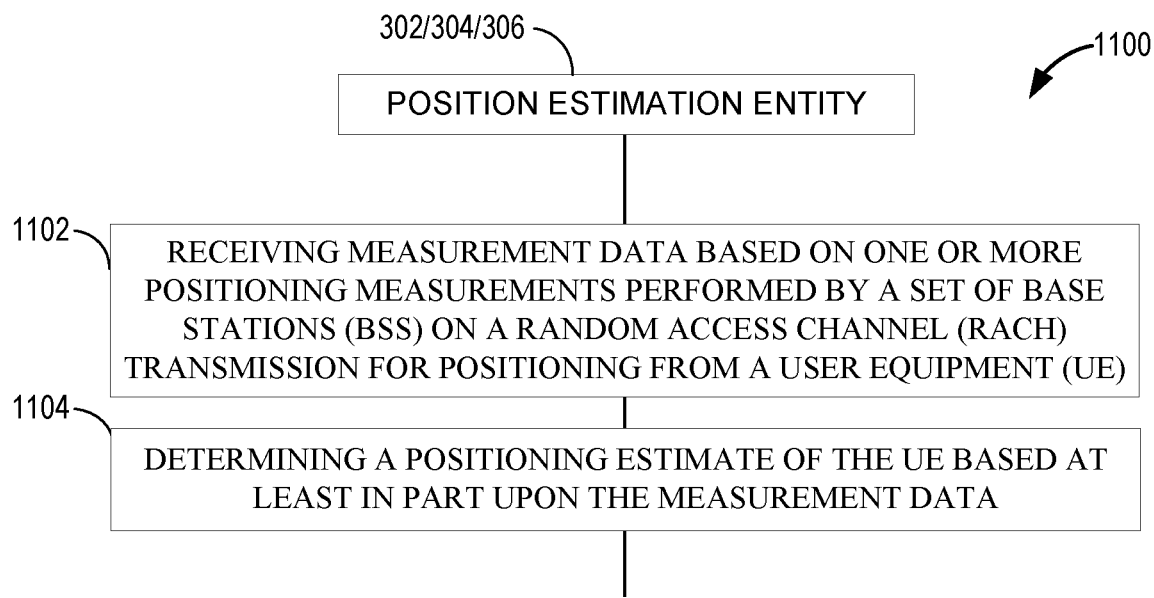
FIG. 11 illustrates an exemplary process of wireless communication, according to aspects of the disclosure.

FIG. 11 illustrates an exemplary process 1100 of wireless communication, according to aspects of the disclosure. The process 1100 may be performed by a position estimation entity, such as LMF, which may be integrated with BS 304 (e.g., a serving BS of UE 302) in some designs, or alternatively may be remote from BS 304, such as network entity 306. In other designs, The position estimation entity may correspond to the UE itself (e.g., for UE-based positioning).

At 1102, the position estimation entity 302/304/306 (e.g., RACH component 344 or 348, receiver 312 or 318 or 324 or 330, etc.) receives measurement data based on one or more positioning measurements performed by a set of BS s on a RACH transmission for positioning from a UE. In an example, the RACH transmission may be part of a partial RACH procedure, although in other designs the RACH transmission may be part of a full PDCCH-triggered RACH procedure for which positioning measurements are performed. In an example, the means for performing the reception of 1102 may include the RACH component 344 or 348, and/or the receiver 312 or 318 or 324 or 330.

At 1104, the position estimation entity 302/304/306 (e.g., positioning component 349 or processing system 332 or 334 or 336) determines a positioning estimate of the UE based at least in part upon the measurement data. In an example, the means for performing the reception of 1104 may include the positioning component 349 and/or processing system 332 or 334 or 336.

Figure 12:
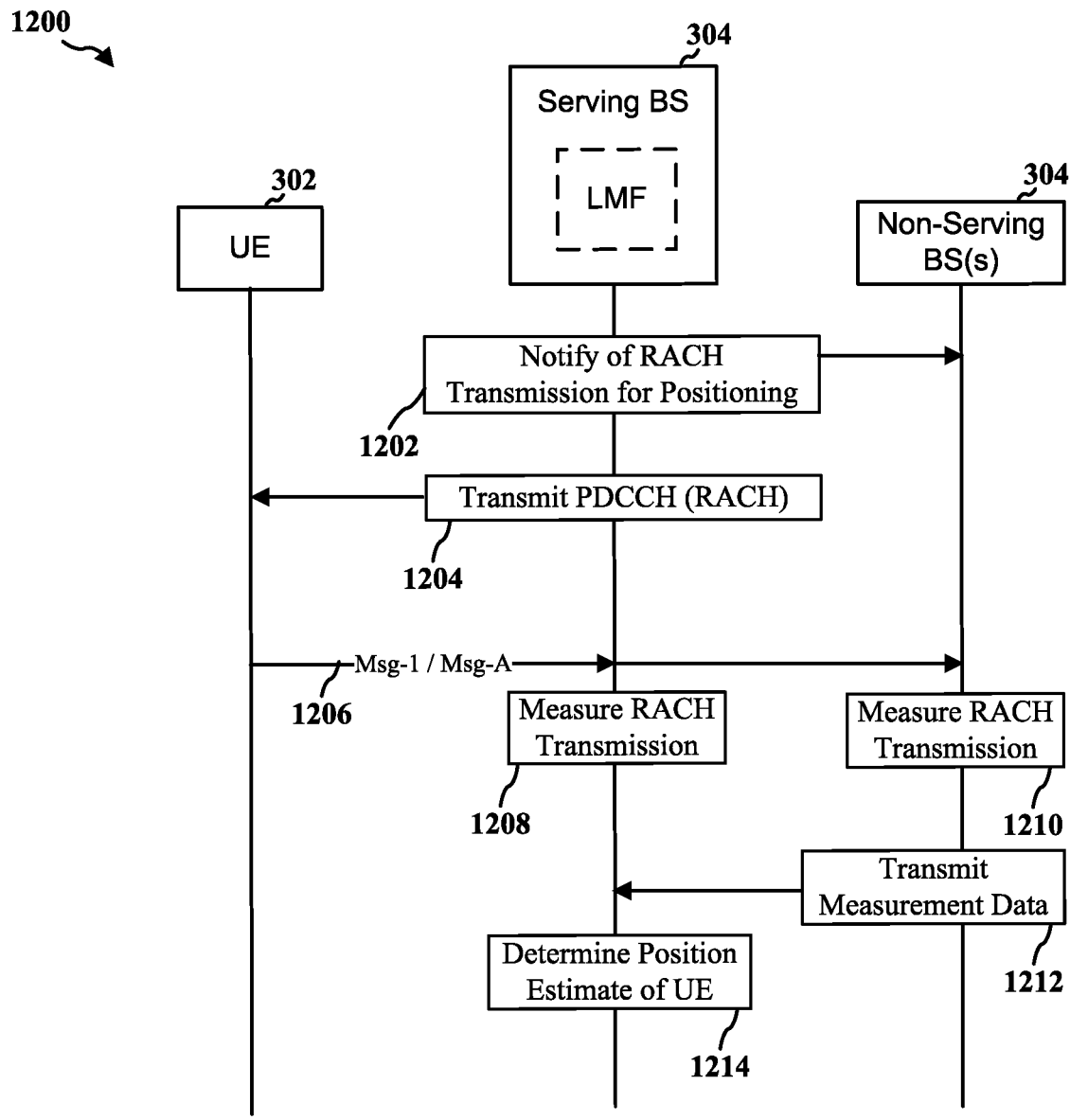
FIG. 12 illustrates an example implementation of the processes in accordance with an aspect of the disclosure.

FIG. 12 illustrates an example implementation 1200 of the processes 800-1100 in accordance with an aspect of the disclosure. In particular, the example implementation 1200 relates to a scenario where the position estimation entity corresponds to LMF is integrated with serving BS 304.

Referring to FIG. 12, at 1202 (e.g., as in 1002 of FIG. 11), serving BS 304 notifies non-serving BS(s) of an upcoming RACH transmission for positioning from UE 302. At 1204 (e.g., as in 802 of FIG. 8 or 902 of FIG. 9), serving BS 304 transmits a PDCCH configured to trigger a partial RACH procedure to UE 302. At 1206 (e.g., as in 804 of FIG. 8 or 904 of FIG. 9 or 1004 of FIG. 10), UE 302 transmits a PRACH preamble (e.g., Msg-1 or Msg-A) in response to the PDCCH from 1204. At 1208, serving BS 304 performs positioning measurement(s) on the PRACH preamble. At 1210, non-serving BS(s) 304 performs positioning measurement(s) on the PRACH preamble. At 1212 (e.g., as in 1102 of FIG. 11), because the LMF is integrated with serving BS 304, non-serving BS(s) 304 send measurement data to the LMF at serving BS 304. At 1214 (e.g., as in 1104 of FIG. 11), the LMF at serving BS 304 determines a positioning estimate for UE 302 based on the measurement data received from the non-serving BS at 1212 as well as measurement data obtained based on the positioning measurements from 1208 at serving BS 304.

Figure 13:
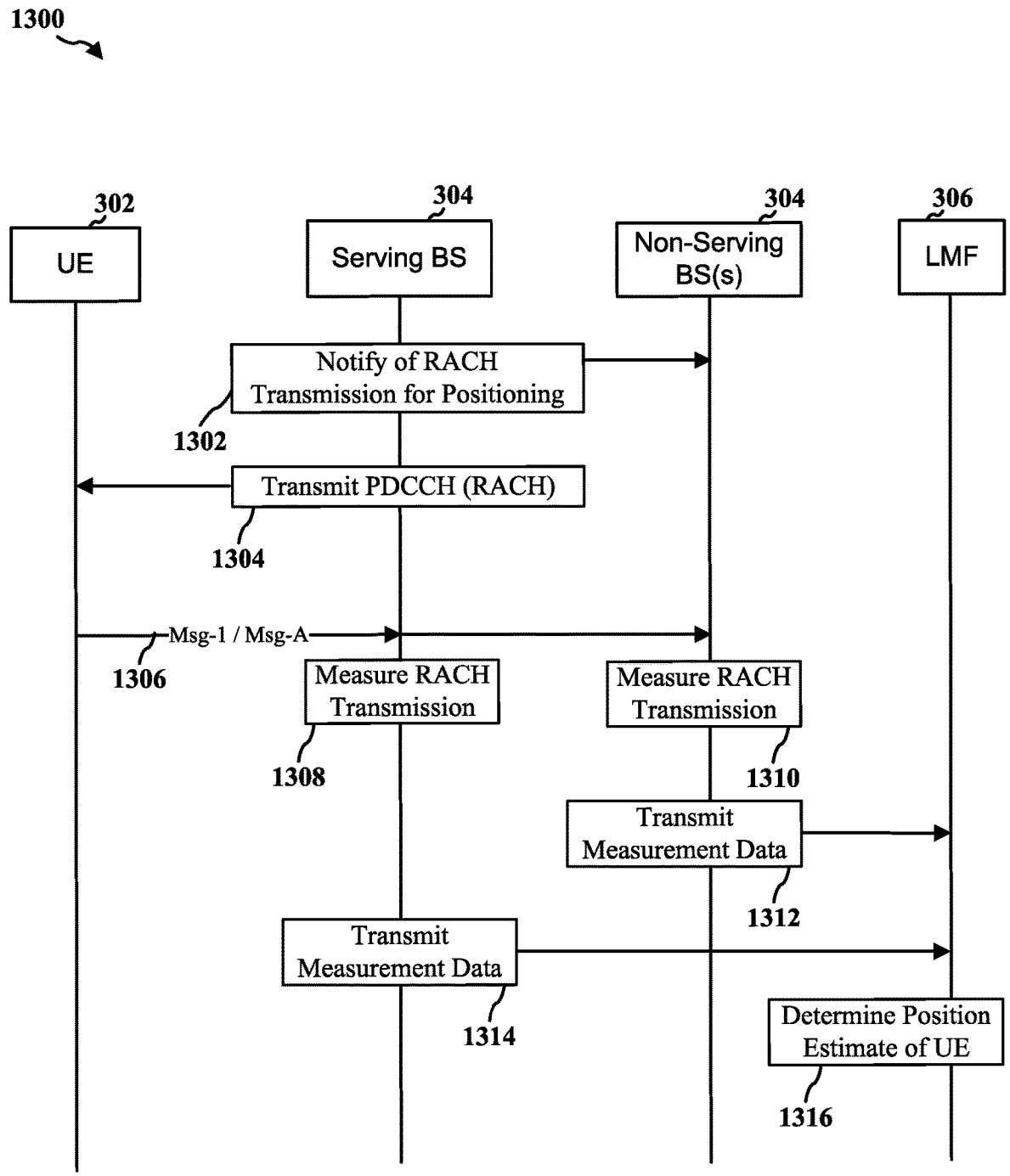
FIG. 13 illustrates an example implementation of the processes in accordance with an aspect of the disclosure.

FIG. 13 illustrates an example implementation 1300 of the processes 800-1100 in accordance with an aspect of the disclosure. In particular, the example implementation 1300 relates to a scenario where the position estimation entity corresponds to LMF is integrated with a network entity 306 that is remote from the serving BS 304 and non-serving BS(s) 304.

Referring to FIG. 13, at 1302 (e.g., as in 1002 of FIG. 11), serving BS 304 notifies non-serving BS(s) of an upcoming RACH transmission for positioning from UE 302. At 1304 (e.g., as in 802 of FIG. 8 or 902 of FIG. 9), serving BS 304 transmits a PDCCH configured to trigger a partial RACH procedure to UE 302. At 1306 (e.g., as in 804 of FIG. 8 or 904 of FIG. 9 or 1004 of FIG. 10), UE 302 transmits a PRACH preamble (e.g., Msg-1 or Msg-A) in response to the PDCCH from 1304. At 1308, serving BS 304 performs positioning measurement(s) on the PRACH preamble. At 1310, non-serving BS(s) 304 performs positioning measurement(s) on the PRACH preamble. At 1312-1314 (e.g., as in 1102 of FIG. 11), because the LMF is integrated with the network entity 306, serving BS 304 and non-serving BS(s) 304 send measurement data to the LMF 306. At 1316 (e.g., as in 1104 of FIG. 11), the LMF 306 determines a positioning estimate for UE 302 based on the measurement data received at 1312-1314.

Referring to FIGS. 8-13, in some designs, the partial RACH procedure may be triggered responsive to a configuration of the PDCCH communication. For example, the partial RACH procedure may be triggered responsive to at least one field of the PDCCH communication. In some designs, the at least one field comprises a radio network temporary identifier (RNTI), or the at least one field may be part of a DCI communication, or any combination thereof. In some designs, the at least one field in the DCI communication may comprise a first value, with the partial RACH procedure comprising a RACH transmission with a first configuration based on the first value. Another DCI communication may then be transported with the at least one field comprising a second value, the another DCI communication triggering another partial RACH procedure comprising another RACH transmission with a second configuration based on the second value. For example, the at least one field may be part of the existing DCI format 1_0 which is currently scrambled with C-RNTI and FDRA set to all ones for PDCCH order based RA preamble, and can instead be scrambled with another bit combination (or value) to indicate a RACH for positioning or partial RACH procedure. For example, the first and second configurations may correspond to different configurations of one or more PRACH preambles (Msg-1 or Msg-A), including but not limited to the following:
- Preamble format,
- Sequence length (e.g., denoted as "L" in FIGS. 4A-4B),
- Numerology or sub-carrier spacing (SCS),
- Bandwidth,
- Cycling Prefix (CP) duration,
- Guard Time (GT) duration,
- Total length, and/or
- Number of OFDM symbols.

Referring to FIGS. 8-13, in some designs, the partial RACH procedure may be triggered responsive to a size of the PDCCH communication (e.g., a new DCI size specific to RACH for positioning or partial RACH procedures).

Referring to FIGS. 8-13, in some designs, the PDCCH which triggers the partial RACH procedure may be part of a sequence of DCIs, each associated with different parameters to transmit multiple RACH instances (or multiple RACH procedures).

Referring to FIGS. 8-13, in some designs, the partial RACH procedure may be part of a joint DL and UL positioning procedure. For example, a PDCCH of a DCI triggering a downlink part (e.g., DL PRS transmission) of the joint DL and UL positioning procedure may be further configured to trigger an uplink part (e.g., UL RACH, or partial RACH procedure for positioning) of the joint DL and UL positioning procedure.

Referring to FIGS. 8-13, in some designs, the partial RACH procedure may comprise:
- a RACH transmission that is transmitted on one or more beams corresponding to a plurality of synchronization signal blocks (SSBs) (e.g., more than one SSB indices maps to the same UL beam, UE just transmits once),
- a RACH transmission that is transmitted over one or more frequency layers on one or more respective RACH occasions, a number of the one or more frequency layers being based on a number of configured frequency layers for the UE (e.g., up to 4 frequency layers can be used for positioning in some designs, and gNB may indicate the RACH occasions on up to the number of configured frequency layers for the UE to transmit UL PRS; note: in general, parallel RACH transmission is not allowed and hence the UE may have to TDM transmissions across multiple frequencies),
- transmission of repetitions of a RACH preamble across multiple RACH or PRACH occasions (e.g., this can improve link budget (or) improve resolution if the PRACH occasions are on different frequency resources), or
- any combination thereof.

Referring to FIGS. 8-13, in some designs, the RACH procedure may be based on a timing offset indicated via the PDCCH communication. For example, timing offset(s) associated with UE Rx-Tx measurements or gNB Rx-Tx measurements (e.g., hardware/circuit delays between receive and transmitter used in various positioning measurements such as RTT, TDOA, etc.). In another example, if a RACH signal is transmitted as part of UL TDoA/AoA procedure, then gNB can provide relevant information about timing to LMF. In another example, if a RACH signal is transmitted as part of RTT/AoD, then either the gNB or the UE can provide the timing information to the LMF (depending on the node which initiates the procedure). Because LMF in general may not be aware of PDCCH order based triggering, the serving gNB may inform LMF and/or other nearby gNBs to listen to the UE's RACH transmission (e.g., as in 1202 of FIG. 12 or 1302 of FIG. 13).

Referring to FIGS. 8-13, in some designs where the RACH transmission of the partial RACH procedure comprises a Msg-A (e.g., PRACH preamble for 2-Step PRACH procedure), relevant information such as DL measurements or UL timing reference can be transmitted on the PUSCH (or Msg-3 component) of the Msg-A, which may be factored into timing at the serving BS 304.

Referring to FIGS. 8-13, in some designs, the RACH transmission of the partial RACH procedure may be transmitted over licensed spectrum that is licensed to a particular radio access technology (RAT) (e.g., LTE, 5G NR, etc.). In other designs, the RACH transmission may be transmitted over shared spectrum that is shared by a plurality of RATs (e.g., LTE, 5G NR, Wi-Fi or 802.11, etc.).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: receiving a physical downlink control channel (PDCCH) communication; and triggering, in response to the PDCCH communication, a partial random access channel (RACH) procedure.

Clause 2. The method of clause 1, wherein the partial RACH procedure comprises transmission of a RACH signal for positioning.

Clause 3. The method of clause 2, wherein the RACH signal for positioning is targeted to a serving base station (BS) of the UE and at least one non-serving BS of the UE.

Clause 4. The method of any of clauses 1 to 3, wherein the triggering is responsive to a configuration of the PDCCH communication.

Clause 5. The method of clause 4, wherein the triggering is responsive to at least one field of the PDCCH communication.

Clause 6. The method of clause 5, wherein the at least one field comprises a radio network temporary identifier (RNTI), or wherein the at least one field is part of a downlink control information (DCI) communication, or any combination thereof.

Clause 7. The method of any of clauses 5 to 6, wherein the at least one field in the DCI communication comprises a first value, the partial RACH procedure comprising a RACH transmission with a first configuration based on the first value, further comprising: receiving another DCI communication with the at least one field comprising a second value, the another DCI communication triggering another partial RACH procedure comprising another RACH transmission with a second configuration based on the second value.

Clause 8. The method of any of clauses 4 to 7, wherein the triggering is responsive to a size of the PDCCH communication.

Clause 9. The method of any of clauses 1 to 8, wherein the partial RACH procedure is a partial 4-Step RACH procedure, wherein the partial RACH procedure comprises transmission of a RACH preamble only without a RACH response to the RACH preamble.

Clause 10. The method of any of clauses 1 to 9, wherein the partial RACH procedure is a partial 2-Step RACH procedure, and wherein the partial RACH procedure comprises transmission of a RACH preamble and a physical uplink shared channel (PUSCH) communication without a RACH response to the RACH preamble or the PUSCH communication.

Clause 11. The method of any of clauses 1 to 10, wherein the UE does not have an active sounding reference signal (SRS) configuration for triggering transmission of an SRS for positioning during the receiving and the triggering.

Clause 12. The method of any of clauses 1 to 11, wherein the partial RACH procedure comprises a RACH transmission that is transmitted on one or more beams corresponding to a plurality of synchronization signal blocks (SSBs), wherein the partial RACH procedure comprises a RACH transmission that is transmitted over one or more frequency layers on one or more respective RACH occasions, a number of the one or more frequency layers being based on a number of configured frequency layers for the UE, wherein the partial RACH procedure comprises transmission of repetitions of a RACH preamble across multiple RACH occasions, or any combination thereof.

Clause 13. The method of any of clauses 1 to 12, wherein the RACH procedure is based on a timing offset indicated via the PDCCH communication.

Clause 14. The method of any of clauses 1 to 13, wherein the RACH procedure is performed over licensed spectrum that is licensed to a particular radio access technology (RAT), or wherein the RACH procedure is performed over shared spectrum that is shared by a plurality of RATs.

Clause 15. The method of any of clauses 1 to 14, wherein the partial RACH procedure is an uplink part of a joint uplink and downlink positioning procedure, and wherein the PDCCH is further configured to trigger a downlink part of the joint uplink and downlink positioning procedure.

Clause 16. A method of operating a serving base station (BS) of a user equipment (UE), comprising: transmitting, to the UE, a physical downlink control channel (PDCCH) communication configured to trigger a partial random access channel (RACH) procedure; and receiving, from the UE in response to the PDCCH communication, a RACH transmission.

Clause 17. The method of clause 16, wherein the RACH transmission is for positioning, further comprising: performing one or more positioning measurements on the RACH transmission.

Clause 18. The method of clause 17, wherein the RACH signal for positioning is targeted to a serving BS of the UE and at least one non-serving BS of the UE.

Clause 19. The method of clause 18, further comprising: notifying the at least one non-serving BS or a location management function (LMF) of the partial RACH procedure to facilitate the at least one non-serving BS to perform positioning measurements on the RACH transmission.

Clause 20. The method of any of clauses 17 to 19, further comprising: sending measurement data based on the one or more positioning measurements to a position estimation entity.

Clause 21. The method of any of clauses 16 to 20, wherein the PDCCH communication is configured to trigger the partial RACH procedure based on a configuration of the PDCCH communication.

Clause 22. The method of clause 21, wherein the PDCCH communication is configured to trigger the partial RACH procedure based on at least one field of the PDCCH communication.

Clause 23. The method of clause 22, wherein the at least one field comprises a radio network temporary identifier (RNTI), or wherein the at least one field is part of a downlink control information (DCI) communication, or any combination thereof.

Clause 24. The method of clause 23, wherein the at least one field in the DCI communication comprises a first value, the RACH transmission arranged with a first configuration based on the first value, further comprising: transmitting another DCI communication with the at least one field comprising a second value, the another DCI communication configured to trigger another partial RACH procedure comprising another RACH transmission with a second configuration based on the second value.

Clause 25. The method of any of clauses 22 to 24, wherein the PDCCH communication is configured to trigger the partial RACH procedure based on a size of the PDCCH communication.

Clause 26. The method of any of clauses 16 to 25, wherein the partial RACH procedure is a partial 4-Step RACH procedure, wherein the partial RACH procedure comprises reception of a RACH preamble only without a RACH response to the RACH preamble.

Clause 27. The method of any of clauses 16 to 26, wherein the partial RACH procedure is a partial 2-Step RACH procedure, and wherein the partial RACH procedure comprises reception of a RACH preamble and a physical uplink shared channel (PUSCH) communication without a RACH response to the RACH preamble or the PUSCH communication.

Clause 28. The method of any of clauses 16 to 27, wherein the UE does not have an active sounding reference signal (SRS) configuration for triggering transmission of an SRS for positioning during the transmitting and the receiving.

Clause 29. The method of any of clauses 16 to 28, wherein the RACH transmission is received on one or more beams corresponding to a plurality of synchronization signal blocks (SSBs), wherein the RACH transmission is received over one or more frequency layers on one or more respective RACH occasions, a number of the one or more frequency layers being based on a number of configured frequency layers for the UE, wherein the RACH transmission comprises repetitions of a RACH preamble across multiple RACH occasions, or any combination thereof.

Clause 30. The method of any of clauses 16 to 29, wherein the RACH procedure may be based on a timing offset indicated via the PDCCH communication.

Clause 31. The method of any of clauses 16 to 30, wherein the RACH transmission is received over licensed spectrum that is licensed to a particular radio access technology (RAT), or wherein the RACH transmission is received over shared spectrum that is shared by a plurality of RATs.

Clause 32. The method of any of clauses 16 to 31, wherein the partial RACH procedure is an uplink part of a joint uplink and downlink positioning procedure, and wherein the PDCCH is further configured to trigger a downlink part of the joint uplink and downlink positioning procedure.

Clause 33. A method of operating a non-serving base station (BS) of a user equipment (UE), comprising: receiving an indication of a random access channel (RACH) transmission from the UE that is associated with a partial RACH procedure; and receiving the RACH transmission based on the indication.

Clause 34. The method of clause 33, wherein the RACH transmission is for positioning, further comprising: performing one or more positioning measurements on the RACH transmission.

Clause 35. The method of clause 34, further comprising: sending measurement data based on the one or more positioning measurements to a position estimation entity.

Clause 36. The method of any of clauses 33 to 35, wherein the partial RACH procedure is a partial 4-Step RACH procedure, wherein the partial RACH procedure comprises transmission of a RACH preamble only without a RACH response to the RACH preamble.

Clause 37. The method of any of clauses 33 to 36, wherein the partial RACH procedure is a partial 2-Step RACH procedure, and wherein the partial RACH procedure comprises transmission of a RACH preamble and a physical uplink shared channel (PUSCH) communication without a RACH response to the RACH preamble or the PUSCH communication.

Clause 38. The method of any of clauses 33 to 37, wherein the RACH transmission is received over licensed spectrum that is licensed to a particular radio access technology (RAT), or wherein the RACH transmission is received over shared spectrum that is shared by a plurality of RATs.

Clause 39. The method of any of clauses 16 to 38, wherein the partial RACH procedure is an uplink part of a joint uplink and downlink positioning procedure.

Clause 40. A method of operating a position estimation entity, comprising: receiving measurement data based on one or more positioning measurements performed by a set of base stations (BSs) on a random access channel (RACH) transmission for positioning from a user equipment (UE); and determining a positioning estimate of the UE based at least in part upon the measurement data.

Clause 41. The method of clause 40, wherein the RACH transmission is associated with a partial RACH procedure.

Clause 42. The method of clause 41, wherein the partial RACH procedure is triggered by a physical downlink control channel (PDCCH) communication from a serving BS of the UE.

Clause 43. The method of any of clauses 41 to 42, wherein the partial RACH procedure is a partial 4-Step RACH procedure, wherein the partial RACH procedure comprises transmission of a RACH preamble only without a RACH response to the RACH preamble.

Clause 44. The method of any of clauses 41 to 43, wherein the partial RACH procedure is a partial 2-Step RACH procedure, and wherein the partial RACH procedure comprises transmission of a RACH preamble and a physical uplink shared channel (PUSCH) communication without a RACH response to the RACH preamble or the PUSCH communication.

Clause 45. The method of any of clauses 41 to 44, wherein the RACH transmission for positioning is transmitted by the UE over licensed spectrum that is licensed to a particular radio access technology (RAT), or wherein the RACH transmission is received over shared spectrum that is shared by a plurality of RATs.

Clause 46. An apparatus comprising a memory and at least one processor communicatively coupled to the memory, the memory and the at least one processor configured to perform a method according to any of clauses 1 to 45.

Clause 47. An apparatus comprising means for performing a method according to any of clauses 1 to 45.

Clause 48. A non-transitory computer-readable medium storing computer-executable instructions, the computer-executable comprising at least one instruction for causing a computer or processor to perform a method according to any of clauses 1 to 45.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a position estimation entity, comprising:
   receiving measurement data based on one or more positioning measurements performed by a set of wireless network components on a random access channel (RACH) transmission for positioning from a user equipment (UE); and
   determining a positioning estimate of the UE based at least in part upon the measurement data,
   wherein the RACH transmission is associated with a partial RACH procedure, and
   wherein the partial RACH procedure is a partial 4-Step RACH procedure, and the partial RACH procedure comprises transmission of a 4-Step RACH preamble only without a 4-Step RACH response to the 4-Step RACH preamble, or
   wherein the partial RACH procedure is a partial 2-Step RACH procedure, and the partial RACH procedure comprises transmission of a 2-Step RACH preamble and a physical uplink shared channel (PUSCH) communication without a 2-Step RACH response to the 2-Step RACH preamble or the PUSCH communication.

2. The method of claim 1, wherein the partial RACH procedure is triggered by a physical downlink control channel (PDCCH) communication from a serving wireless network component of the UE.

3. The method of claim 1,
   wherein the partial RACH procedure is the partial 4-Step RACH procedure.

4. The method of claim 1,
   wherein the partial RACH procedure is the partial 2-Step RACH procedure.

5. The method of claim 1,
   wherein the RACH transmission for positioning is transmitted by the UE over licensed spectrum that is licensed to a particular radio access technology (RAT), or
   wherein the RACH transmission is received over shared spectrum that is shared by a plurality of RATs.

6. A position estimation entity, comprising:
   a memory;
   a communication interface; and
   at least one processor communicatively coupled to the memory and the communication interface, the at least one processor configured to:
   receive, via the communication interface, measurement data based on one or more positioning measurements performed by a set of wireless network components on a random access channel (RACH) transmission for positioning from a user equipment (UE); and
   determine a positioning estimate of the UE based at least in part upon the measurement data,
   wherein the RACH transmission is associated with a partial RACH procedure, and
   wherein the partial RACH procedure is a partial 4-Step RACH procedure, and the partial RACH procedure comprises transmission of a 4-Step RACH preamble only without a 4-Step RACH response to the 4-Step RACH preamble, or
   wherein the partial RACH procedure is a partial 2-Step RACH procedure, and the partial RACH procedure comprises transmission of a 2-Step RACH preamble and a physical uplink shared channel (PUSCH) communication without a 2-Step RACH response to the 2-Step RACH preamble or the PUSCH communication.

7. The position estimation entity of claim 6, wherein the partial RACH procedure is triggered by a physical downlink control channel (PDCCH) communication from a serving wireless network component of the UE.

8. The position estimation entity of claim 6,
   wherein the partial RACH procedure is partial 4-Step RACH procedure.

9. The position estimation entity of claim 6,
   wherein the partial RACH procedure is the partial 2-Step RACH procedure.

10. The position estimation entity of claim 6,
wherein the RACH transmission for positioning is transmitted by the UE over licensed spectrum that is licensed to a particular radio access technology (RAT), or
wherein the RACH transmission is received over shared spectrum that is shared by a plurality of RATs.

* * * * *